United States Patent

[11] 3,614,741

[72] Inventors Harold L. McFarland, Jr. Concord; James F. O'Loughlin, Westford, both of Mass.
[21] Appl. No. 21,973
[22] Filed Mar. 23, 1970
[45] Patented Oct. 19, 1971
[73] Assignee Digital Equipment Corporation Maynard, Mass.

[54] DATA PROCESSING SYSTEM WITH INSTRUCTION ADDRESSES IDENTIFYING ONE OF A PLURALITY OF REGISTERS INCLUDING THE PROGRAM COUNTER
24 Claims, 24 Drawing Figs.

[52] U.S. Cl. .......... 340/172.5
[51] Int. Cl. .......... G06f 9/20
[50] Field of Search .......... 340/172.5

[56] References Cited

UNITED STATES PATENTS 3,425,039 1/1969 Bahrs et al. .......... 340/172.5
3,461,433 8/1969 Emerson .......... 340/172.5
3,015,441 1/1962 Rent et al. .......... 340/172.5 X
3,201,761 8/1965 Schmitt et al. .......... 340/172.5
3,249,920 5/1966 Pulver, Jr. .......... 340/172.5
3,319,226 5/1967 Mott et al. .......... 340/172.5

*Primary Examiner*—Gareth D. Shaw
*Assistant Examiner*—Sydney R. Chirlin
*Attorney*—Cesari and McKenna

ABSTRACT: A data processing system processor unit including memory addressing circuits. Operand addresses for identifying data storage locations comprise operand address mode and register selection bits. One of a plurality of registers in the processor unit, which includes the program counter, is selected by decoding the register selection bits. The selected register contents are transferred to the processor unit as data, data addresses or addresses of intermediate storage locations containing data addresses to provide direct, indirect or double deferred addressing. Data or data addresses interleaved with or obtained from information interleaved with instructions are obtained by selecting the program counter. This provides immediate, absolute, relative and deferred relative addressing. The selected register contents are modified if certain address modes are used. A given operation code can be combined with one or two operand addresses in order that each instruction can obtain data from locations in the most efficient manner.

| OPERAND ADDRESS | | | | | |
|---|---|---|---|---|---|
| 5 | 4 | 3 | 2 | 1 | Ø |
| ADDRESS MODE | | | REGISTER SELECTION | | |

| ADDRESS MODE | ADDRESS MODE BITS 5 | 4 | 3 | DEFINITION |
|---|---|---|---|---|
| Ø | Ø | Ø | Ø | REGISTER-DIRECT |
| 1 | Ø | Ø | 1 | REGISTER DEFERRED |
| 2 | Ø | 1 | Ø | AUTO-INC DIRECT |
| 3 | Ø | 1 | 1 | AUTO-INC DEFERRED |
| 4 | 1 | Ø | Ø | AUTO-DEC DIRECT |
| 5 | 1 | Ø | 1 | AUTO-DEC DEFERRED |
| 6 | 1 | 1 | Ø | INDEX DIRECT |
| 7 | 1 | 1 | 1 | INDEX DEFERRED |

| REGISTER SELECTION BITS 2 | 1 | Ø | SELECTED REGISTER |
|---|---|---|---|
| Ø | Ø | Ø | RØ |
| Ø | Ø | 1 | R1 |
| Ø | 1 | Ø | R2 |
| Ø | 1 | 1 | R3 |
| 1 | Ø | Ø | R4 |
| 1 | Ø | 1 | R5 |
| 1 | 1 | Ø | R6 |
| 1 | 1 | 1 | R7 |

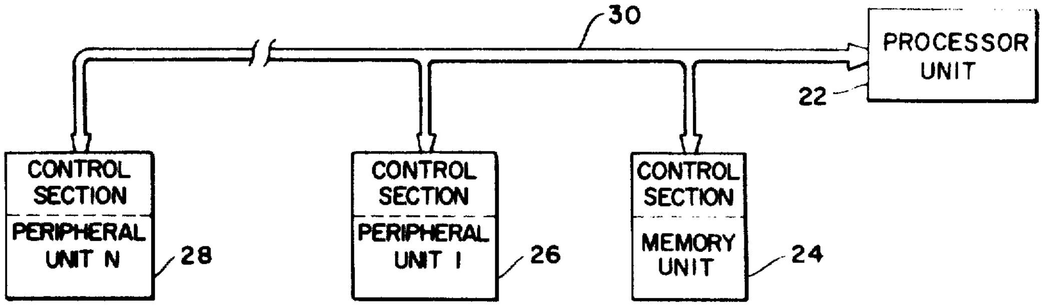

FIG. 1

| OPERAND ADDRESS | | | | | |
|---|---|---|---|---|---|
| 5 | 4 | 3 | 2 | 1 | Ø |
| ADDRESS MODE | | | REGISTER SELECTION | | |

| ADDRESS MODE | ADDRESS MODE BITS 5 | 4 | 3 | DEFINITION |
|---|---|---|---|---|
| Ø | Ø | Ø | Ø | REGISTER-DIRECT |
| 1 | Ø | Ø | 1 | REGISTER DEFERRED |
| 2 | Ø | 1 | Ø | AUTO-INC DIRECT |
| 3 | Ø | 1 | 1 | AUTO-INC DEFERRED |
| 4 | 1 | Ø | Ø | AUTO-DEC DIRECT |
| 5 | 1 | Ø | 1 | AUTO-DEC DEFERRED |
| 6 | 1 | 1 | Ø | INDEX DIRECT |
| 7 | 1 | 1 | 1 | INDEX DEFERRED |

| REGISTER SELECTION BITS 2 | 1 | Ø | SELECTED REGISTER |
|---|---|---|---|
| Ø | Ø | Ø | RØ |
| Ø | Ø | 1 | R1 |
| Ø | 1 | Ø | R2 |
| Ø | 1 | 1 | R3 |
| 1 | Ø | Ø | R4 |
| 1 | Ø | 1 | R5 |
| 1 | 1 | Ø | R6 |
| 1 | 1 | 1 | R7 |

FIG. 4

INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS

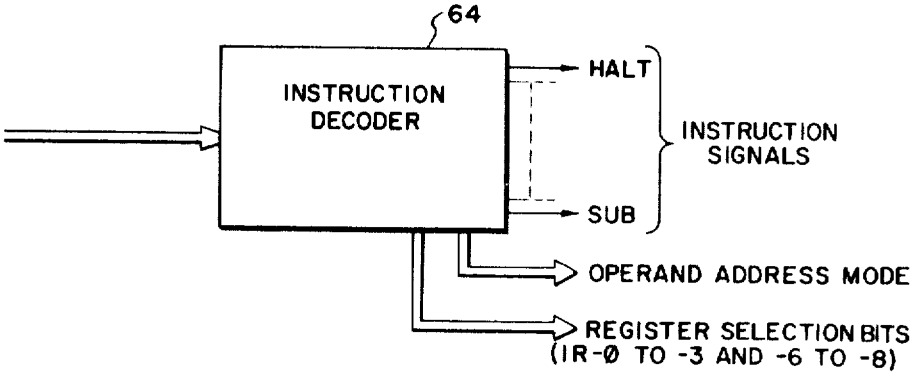

| INSTRUCTION CATEGORY | INSTRUCTION | INSTRUCTION FORMAT | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | Ø |
| CONTROL | HALT | Ø | Ø | Ø | Ø | Ø | Ø | Ø | Ø | Ø | Ø | Ø | Ø | Ø | Ø | Ø | Ø |
| | RTI | | | | | | | | | | | | | | | 1 | Ø |
| | RTS | | | | | | | | | 1 | Ø | Ø | Ø | Ø | REG. | | |
| | BEQ | | | | | | | 1 | T | OFFSET | | | | | | | |
| ONE-ADDRESS | JMP | Ø | Ø | Ø | Ø | Ø | Ø | Ø | Ø | Ø | 1 | OPERAND ADDRESS | | | | | |
| | JSR | | | | | 1 | Ø | Ø | REG. | | | | | | | | |
| | CLR | | | | | 1 | Ø | 1 | Ø | Ø | Ø | | | | | | |
| | COM | | | | | | | | Ø | Ø | 1 | | | | | | |
| | INC | | | | | | | | Ø | 1 | Ø | | | | | | |
| | DEC | | | | | | | | Ø | 1 | 1 | | | | | | |
| | NEG | | | | | | | | 1 | Ø | Ø | | | | | | |
| | ADC | | | | | | | | 1 | Ø | 1 | | | | | | |
| | SBC | | | | | | | | 1 | 1 | Ø | | | | | | |
| | TST | | | | | | | | 1 | 1 | 1 | | | | | | |
| | ROS | | | | | 1 | 1 | Ø | Ø | S | L | | | | | | |
| TWO-ADDRESS | MOV | Ø | Ø | Ø | 1 | OPERAND 1 ADDRESS | | | | | | OPERAND 2 ADDRESS | | | | | |
| | CMP | | Ø | 1 | Ø | | | | | | | | | | | | |
| | BIT | | Ø | 1 | 1 | | | | | | | | | | | | |
| | BIC | | 1 | Ø | Ø | | | | | | | | | | | | |
| | BIS | | 1 | Ø | 1 | | | | | | | | | | | | |
| | ADD | | 1 | 1 | Ø | | | | | | | | | | | | |
| | SUB | 1 | 1 | 1 | Ø | | | | | | | | | | | | |

FIG. 3

INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
[signature]
ATTORNEYS INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS

PATENTED OCT 19 1971 3,614,741

SHEET 10 OF 21

INVENTORS
HAROLD L. McFARLAND
JAMES F. O'LOUGHLIN
BY

Cesari and McKenna
ATTORNEYS

INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
ATTORNEYS

| INSTRUCTION | SELECTED INPUT CIRCUIT | | | |
|---|---|---|---|---|
| | FIRST OPERAND ADDRESS | | SECOND OR SINGLE OPERAND ADDRESS | |
| | ADDRESS MODE=Ø | ADDRESS MODE≠Ø | ADDRESS MODE=Ø | ADDRESS MODE≠Ø |
| MOV | B | B | – | – |
| ADD | A | A | B | B |
| SUB | A | A | B | B |
| CMP | B | B | A | A |
| BIT | A | A | A | A |
| BIC | A | A | A | A |
| BIS | B | B | B | B |
| TST | – | – | B | B |
| COM | – | – | A | A |
| INC or ADC | – | – | B | B |
| DEC or SBC | – | – | B | B |
| CLR | – | – | – | – |
| NEG | – | – | A | A |

INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
ATTORNEYS INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
ATTORNEYS INVENTORS
HAROLD L. McFARLAND
JAMES F. O'LOUGHLIN
BY
ATTORNEYS

PATENTED OCT 19 1971 3,614,741

SHEET 19 OF 21

INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS INVENTORS
HAROLD L. McFARLAND
JAMES F. O'LOUGHLIN
BY
Cesari and McKenna
ATTORNEYS

DATA PROCESSING SYSTEM WITH INSTRUCTION ADDRESSES IDENTIFYING ONE OF A PLURALITY OF REGISTERS INCLUDING THE PROGRAM COUNTER

BACKGROUND OF THE INVENTION

1. Field of Invention

This invention generally relates to data processing systems and more specifically to processor units for data processing systems capable of addressing different locations in the system.

2. Discussion of Prior Art

A data processing system usually includes a processor unit which executes instructions that are stored at addressed locations in a memory unit and transferred to the processor unit sequentially under the control of a program counter. The data that the computer processes is transferred into and out of the processor unit by way of input/output devices, or peripheral units, such as teletypewriters, tape punches or card readers. Usually, the data is obtained from temporary storage locations in the memory unit by the peripheral units or the processor unit.

During normal operation, an instruction is retrieved from a memory location designated by the program counter. Each instruction normally includes an operation code and an operand address. The operation code defines the operation to be performed by the processor unit, while the operand address identifies the memory location of the data to be operated upon or the memory location to which the data is to be transferred.

Any one of several methods for specifying these addresses may be adopted. The approach which is adopted depends upon several factors, such as the number of storage locations in the memory unit, the number of bits in a computer word and the types of addressing which are desired. For example, if the memory unit has 4096 storage locations (commonly a "4K" memory), a 12-bit address is required to specify any given location. If all addressing is to be done directly from the operand address part of an instruction, the number of operation codes may be severely limited. For example, many data processing systems commonly use 16-bit computer words; a 12-bit operand address would leave only four bits for the operation code, thereby limiting the instruction repertoire to 16 operation codes.

Some data processing systems operate with 12-bit computer words. Direct addressing of all memory locations requires that the number of memory locations be reduced well below 4,096, Alternatively, an instruction might be stored in two locations, one containing the operation code and the other, the operand address. This approach substantially increases the processor unit time required for execution. It also increases the number of memory locations required to store the instruction.

Several other alternatives are available. In one approach called "paging," the memory is divided into pages with the operand address field then selectively addressing either the current memory page or a reference memory page. If data is stored in the current or reference page, "direct addressing" is available. However, if the location is in another memory page, "indirect addressing" is necessary. With "indirect addressing," the operand address specifies a location on the current or reference page, the contents of that location being the address of the memory location with the data. While paging increases the instruction repertoire, operating times are increased and only direct and indirect addressing are permitted.

In other data processing systems using instructions with twenty or more bits, one register in two register sets is selected by the operand address. The information in one set of registers comprises data or an instruction when direct addressing is used and a data or instruction address if indirect addressing is used. The contents of the other set of registers comprises a memory location addressed by the corresponding register in the first set. While this addressing method permits any memory location to be specified with substantially equal facility, addressing flexibility is obtained by increasing the number of instructions. For example, any number of addressing modes is obtained for an addition instruction by using several instructions. One instruction provides direct and indirect addressing while another instruction provides another one or two operating modes to perform the same operation. Hence, one instruction contains limited addressing flexibility. The increases in the number of instructions increases programming complexity.

In still other data processing systems, the number of bits required to identify a memory location are reduced by storing instructions and data separately in blocks of contiguous memory locations. The first instruction and data addresses are stored in different registers. Thereafter, the individual register contents are modified to obtain the address for either an instruction or data. While this approach is very efficient where the instructions and data are easily assembled into separate groups, difficulty is encountered if data or an instruction is in a random location separated from either block. Furthermore, programming also becomes more difficult whenever the programmer must actually separate data and related instructions as they appear in the program.

Data processing systems, such as those described, usually include instructions which provide direct addressing and one other type of addressing. However, situations often are encountered when a program is written where additional types of addressing would increase efficiency. The obvious approach of merely providing the data processing system with existing and necessary circuitry to increase addressing flexibility increases the complexity and cost of the data processing system and also usually increases the number of bits in the operand address. This approach is not usually justified, so the types of addressing are limited to those which are statistically important for the intended data processing system use. Increased execution time, which would be avoided if additional addressing flexibility were available, are accepted.

It is an object of this invention to provide a data processing system which provides flexible addressing.

Another object of this invention is to provide a data processing system with flexible addressing without a significant increase in memory requirements.

Still another object of this invention is to provide a data processing system with flexible addressing which permits system operating efficiency to be increased.

Yet another object of this invention is to provide a data processing system with flexible addressing which enables greater programming latitude without a corresponding increase in programming complexity.

SUMMARY

Briefly stated, the operand address portion of an instruction comprises an operand address mode portion and a register selection code. Decoded address signals responsive to the instruction operation code and operand address select one of several registers in a processor unit which include the program counter. The operand address mode portion indicates whether the selected register contains data, a data address or an address for an intermediate location storing a data address. After the processor decodes the operand address, it obtains the designated data or operand.

The invention is pointed out with particularity in the appended claims. A more thorough understanding of the above and further objects and advantages of this invention may be attained by referring to the following detailed description taken in conjunction with accompanying drawings.

BRIEF DESCRIPTION OF THE DRAWINGS

FIG. 1 illustrates a data processing system adapted to implement this invention.

FIG. 3 depicts an embodiment of the instruction decoder in the processor unit of FIG. 2;

FIG. 4 illustrates the organization of an instruction operand address;

DESCRIPTION OF AN ILLUSTRATIVE EMBODIMENT

1. General Description

The data processing system illustrated in FIG. 1 includes a processor unit 22, a random access memory unit 24 and a plurality of peripheral units, such as peripheral units 26 and 28. The various units are interconnected by a bidirectionally conducting bus 30 to permit direct data and instruction transfers between them. While the exemplary system in FIG. 1 provides all the advantages of the disclosed invention, the invention is adapted for implementation in other configurations with the realization of some, if not all, its advantages.

Each peripheral unit and memory unit includes a control section containing data buffer registers, address decoding circuits for selection purposes, and other circuit elements necessary for unit control. The details of these control sections and additional advantages of the configuration shown in FIG. 1 can be more readily obtained by referring to the copending patent application Ser. No. 24,636 entitled "Data Processing System," filed Apr. 1, 1970 and assigned to the same assignee as the present invention.

Figure 2:
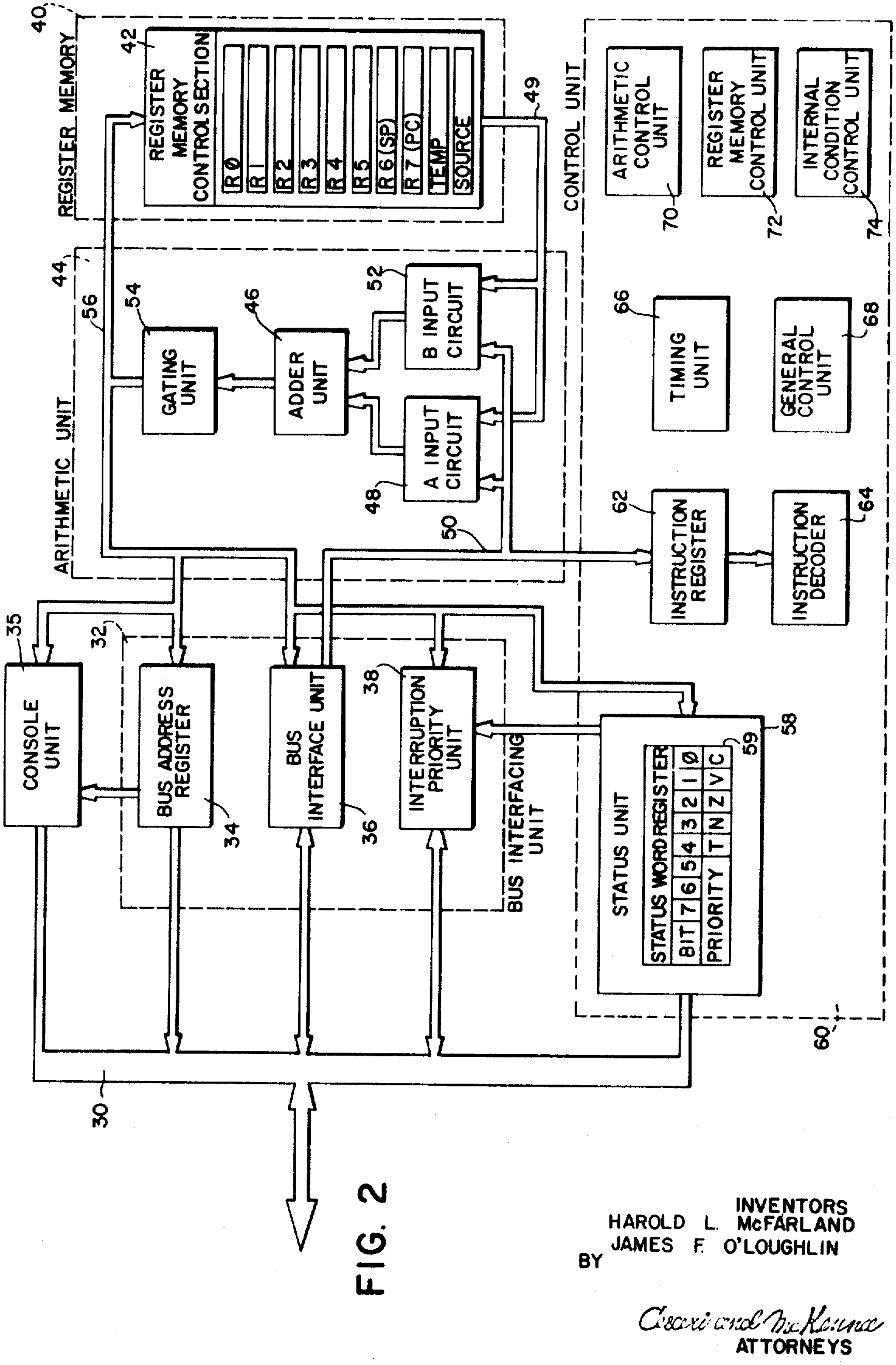
FIG. 2 is a schematic of an embodiment of the processor unit shown in FIG. 1.

The processor unit 22 is shown in FIG 2. It is coupled to the bus 30 through a plurality of connections. The primary connection is through a bus interfacing unit 32 comprising a bus address register 34, a bus interface unit 36, and an interruption priority unit 38. Information in the form of data or instructions is transmitted to or retrieved from locations constituted by the peripheral units or memory unit. Each location defined by an address in the bus address register 34 and the data or instruction is transferred over the bus 30.

The bus address register 34 also transfers data to a console unit 35 which is coupled to the bus 30. This enables the contents of the bus address register 34 to be transferred to the console unit 35 for display purposes. Addresses may also be supplied by the console unit 35 to the bus 30 for testing or other purposes.

A register memory 40 comprises a control section 42 and a plurality of storage registers identified as R0 through R7, TEMP and SOURCE. The R7 register is the program counter and is identified as either the R7 or PC register depending upon its function. The R6 register is designated as an SP register when it functions to identify contiguous memory unit locations. Details of the register memory 40 are described with reference to FIG. 12.

Still referring to FIG. 2, an arithmetic unit 44 includes an adder unit 46 and two input circuits. The A and B input circuits 48 and 52 each receive inputs from the register memory 40 on a bus 49 and from the bus interface unit 36 on a bus 50. Output signals from the adder unit 46 are transmitted through a gating unit 54 with rotating and shifting capabilities onto a bus 56. The bus 56 is coupled to the bus address register 34, the bus interface unit 36, the interruption priority unit 38, the register memory 40 and a status unit 58. The status unit 58 includes a status register 59 and is located in a control unit 60. The functions of the interruption priority unit 38 and status unit 58 are fully described in another copending patent application Ser. No. 21,957 entitled "Data Processing System With Circuits For Transferring Between Operating Routines, Interruption Routines and Subroutines," filed concurrently herewith and assigned to the same assignee as the present invention.

The 8-bit status register 59 is shown in FIG. 2 and stores the least significant eight bits on the bus 56 when they define the processor priority, previous operations and whether the processor unit can be stopped or "trapped" after an instruction. Specifically, the priority bits (bits 5, 6, and 7) define one of eight priorities. A T bit (bit 4) is set to provide trapping. An N bit (bit 3) may be set if the result of the previous instruction was negative, while a Z bit (bit 2) may be set for zero results. A V bit (bit 1) may be set when an arithmetic overflow occurs while the C bit (bit 0) may be set when a carry is generated by the adder unit 46 for the most significant bit.

Information transfers within the processor unit 22 are supervised by the control unit 60. Generally, instructions are coupled from the bus 50 to an instruction register 62 for decoding in an instruction decoder 64 in response to signals from timing unit 66 and a general control unit 68. The timing signal and signals from the instruction decoder 64 and the general control unit 68 are also coupled to a arithmetic control unit 70 which controls the various units in the arithmetic unit 44.

Operations in the register memory 40 are controlled by a register memory control unit 72. Internal computer operating conditions are monitored by an internal condition control unit 74 which also responds to other signals in the control unit 60. Signals indicating the existence of certain internal conditions can be coupled through the B input circuit 52, adder unit 46 and gating unit 54 onto the bus 56.

Before describing the details necessary to a complete understanding of this invention, it will be helpful to review how the processor unit 22 transfers information in response to various instructions. During a "fetch" cycle, described in detail with reference to FIG. 5, the control unit 60, including the arithmetic control unit 70 and the register memory control unit 72, transfers the program count from the PC register (the R7 register in the register memory 40) through the B input circuit 52, the adder unit 46 and gating unit 54 to the bus address register 34 without modification. The program count is then incremented and returned to the PC register. Then the instruction in the location addressed by the bus address register 34 is obtained and coupled through bus interface unit 36 into the instruction register 62. After the instruction is decoded in the instruction decoder 64, as described with reference to FIG. 3, the control unit 60 completes the "fetch" cycle. If the instruction is one of several control instructions shown in FIG. 3, the control unit 60 may cause the processor unit 22 to divert to either an "execute" or a "term" cycle. If the instruction contains one or two operand addresses, these operand addresses are decoded and the data defined by the operand addresses is transferred to the arithmetic unit 44 for modification in accordance with the operation code.

After the data has been transferred to the processor unit 22, either a "term" or "execute" cycle is used to complete the operation. The "execute" cycle operates on the data retrieved during the "fetch" cycle in accordance with the operation code. During the "term" cycle, the processor unit 22 determines whether any interrupting conditions exist which require diversion to another program. This last function is more fully described in the previously identified copending patent application Ser. No. 21,957.

As previously indicated, the operand address comprises an address mode portion and a register selection code, each containing three bits as shown in FIG. 4. The register selection bits define one of the registers R0 through R7 in the register memory 4 (FIG. 2) while the address mode bits define eight address modes. Therefore, it is immediately apparent that eight address modes and eight registers are available. As one of the eight registers is the program counter, additional flexibility is also obtained for example, addressing the program counter as a register can provide direct access to data interleaved with instructions.

The range of addressing modes can be more fully appreciated by considering two extreme examples: *direct addressing* and *deferred relative addressing*. Direct addressing is obtained with a MODE–0 operand address and selection of one register such as the R1 register. The contents of the R1 register are moved to one of the A or B input circuits 48 or 52 as data. *Deferred relative addressing* is provided by a MODE–7 operand address which selects the R7, or PC, register. The program counter contents are used to obtain an index value from the next program location. The index value is added to the incremented program count; and the sum is transferred to the bus register 34 as an intermediate memory address. After the contents of this intermediate location are moved through the processor unit to the bus address register 34, the data is obtained.

Therefore, the number of memory locations which can be addressed is not directly related to the size of the operand address. In accordance with this invention, memory units with "32K" locations are addressed with 6–bit operand addresses shown in FIG. 4. Unlike other register addressing schemes, however, any instruction operand address can be characterized by any mode and by selecting any one of the registers. Compromising between memory unit size and operand address size is no longer a substantial consideration when this invention is utilized on a data processing system. As becomes more apparent in the detailed description, addressing flexibility provided by implementing this invention does not substantially increase the complexity of the processor unit or programming.

Furthermore, this invention may also be implemented in data processing systems which use instructions containing two operand addresses to permit data to be retrieved, modified and stored with one machine instruction. These instructions further simplify programming and increase efficiency. For example, two numbers in the memory unit can be added in response to one ADD instruction with two operand addresses. In some data processing systems, four instructions are used to add two such numbers. Two operand addresses formed in accordance with this invention still only require twelve bits so that up to 16 two-operand address instructions may be used with a 16-bit instruction. This still permits a significant number of other instructions to be used while also simplifying programming procedures. Flexibility is additionally increased because each operand address may define a different register or the same register and may have the same or different operand address modes.

2. Detailed Description

As the operation address mode and register selection codes are interrelated and constitute primary signals in the control unit 60, FIGS. 3 and 4 illustrate the format for some exemplary instructions and the significance of the various operand address modes.

a. Instructions

Now referring specifically to FIG. 3, the instructions are arbitrarily divided into control, one-operand address and two-operand address categories for discussion purposes. Each instruction is formed as shown in the Instruction Format column. When a specific instruction is transferred to the instruction decoder 64 (FIGS. 2 and 3), one instruction signal conductor is energized. Each conductor, and its signal when energized, is designated by the same mnemonic as appears in the INSTRUCTION column of FIG. 3.

TABLE I—INSTRUCTIONS

| Instruction | Octal Number | Function |
|---|---|---|
| Control Instructions | | |
| HALT | 000000 | The processor unit 22 diverts to the "term" cycle and stops operation. |
| RTI | 000002 | This is the last instruction in an interruption routine stored in the memory unit 24. The processor unit 22 obtains the next instruction in the interrupted program from the memory unit 24 during the next "fetch" cycle. |
| RTS | 00020R | This is the last instruction in a subroutine. R is a 3-bit register selection code. The processor unit 22 obtains the next instruction in the program with the JSR instruction. |
| BEQ | 001XXX | This is one of several branch instructions where XXX comprises an 8-bit offset value for modifying the PC register contents when (1) the condition is met and bit eight is set or (2) the condition is not met and bit eight is not set. While the BEQ instruction responds to equality, other branch instructions respond to conditions such as a value being greater than, less than, greater than or equal to, less than or equal to, or not equal to a reference. Still other branch instructions sense zero, plus or minus values or other conditions. Unconditional branches are also possible. |
| One-Operand Address Instructions | | |
| JMP | 0001ADR | The processor unit 22 is unconditionally transferred to another set of instructions. The address of the next instruction is stored at the location defined by the operand address ADR. |
| JSR | 004RADR | When it is necessary to obtain an intermediate result from another set of instructions and then return to the original program, the JSR instruction is issued where R is a 3-bit register code. The initial subroutine instruction address is located by the operand address ADR. The address for the instruction following the JSR instruction in the original program is saved for retrieval in response to the RTS instruction. |
| CLR | 0050ADR | The location defined by the operand address ADR is set to zeros. |
| COM | 0051ADR | The contents of the location defined by the operand address ADR are transferred to the processor unit 22 and complemented; the complemented value is returned to the addressed location. |

Table I – Continued

| | | |
|---|---|---|
| INC | 0052ADR | The contents of the location defined by the operand address ADR are transferred to the processor unit 22 and incremented by a fixed value (usually by +1); and the incremented value is returned to the addressed location. |
| DEC | 0053ADR | The contents of the location defined by the operand address ADR are transferred to the processor unit 22. decremented by a fixed value (usually by −1); and the decremented value is returned to the addressed location. |
| NEG | 0054ADR | The contents of the location defined by the operand address ADR are transferred to the processor unit 22 and converted into the two's complement form and the two's complement form is returned to the addressed location. |
| ADC | 0055ADR | The contents of the location defined by the operand address ADR are transferred to the processor unit 22 to be added to the contents of the "C"-bit from the status register 59; the sum is stored in the addressed location. The ADC instruction permits a carry from the addition of two low-order words to be utilized in a high-order result. |
| SBC | 0056ADR | The contents of the "C"-bit from the status register 59 are subtracted from the contents of the location defined by the operand address ADR in the processor unit 22. The remainder is stored in the addressed location. The SBC instruction permits the carry from the subtraction of two low-order words to be subtracted from the high-order word. |
| TST | 0057ADR | The contents of the Z and N bits are set in accordance with the contents of the location defined by the operand address ADR. |
| ROS | 0060ADR | The contents of the addressed location are rotated one position to the right with most significant bit and carry being replaced with the most significant carry and least significant bit, respectively. |
| | 0061ADR | The contents of the addressed location are rotated one position to the left with the most significant carry and bit being transferred to the least significant bit and most significant carry, respectively. |
| | 0062ADR | The contents of the addressed location are shifted one position to the right with the transfer of the least significant bit to the "C"-bit in the status register and replication of the most significant bit. |
| | 0063ADR | The contents of the addressed location are shifted one position to the left. The most significant bit is transferred to the "C"-bit in the status register; a zero is transferred to the least significant bit. |
| Two-Address Instructions | | |
| MOV | 01XADR | The contents of the location defined by the first operand address are transferred to the location defined by the second operand address without modification. XADR represents two 6-bit operand addresses. |
| CMP | 02XADR | The contents of the location defined by the second operand address are subtracted from the contents of the location defined by the first operand address; the result is used to modify the information stored in the status register 59. |
| BIT | 03XADR | The contents of the locations defined by the first and second operand addresses are combined in a logical "AND" operation; the result is used to modify the contents of the status register 59. |
| BIC | 04XADR | Each bit in the contents defined by the first operand address is complemented and combined in a logical "AND" operation with a corresponding bit in the location defined by the second operand address. This causes each bit in the location defined by the second operand address to be cleared if the corresponding bit in the location defined by the first operand address is set. |
| BIS | 05XADR | The contents of the locations defined by the first and second operand addresses are combined in a logical "OR" operation; the result is stored in the location defined by the second operand address. |
| ADD | 06XADR | The contents of the locations defined by the first and second operand addresses are added; the sum is stored in the location defined by the second operand address. |
| SUB | 16XADR | The contents of the location defined by the first operand address are subtracted from the contents of the location defined by the second operand address; the remainder is stored in the location defined by the second operand address. |

Condition codes, the N, Z, V and C bits in the status register 59 (FIG. 2) are modified appropriately after each instruction is executed.

b. Operand Addresses

Operand addresses have the format shown in FIG. 4. If the instruction contains a single operand address in bits 0 through 5, the data to be operated upon is obtained from and returned to the location defined by the operand address. With two-operand addresses, the first operand address, comprising bits 6 through 11, usually defines the location from which data is obtained. The second operand address, comprising bits 0 through 5, usually define the location to which the data is to be transferred after modification in accordance with the operation code. As described with reference to the instructions, data may be obtained from locations defined by both operand addresses.

Figure 5A:
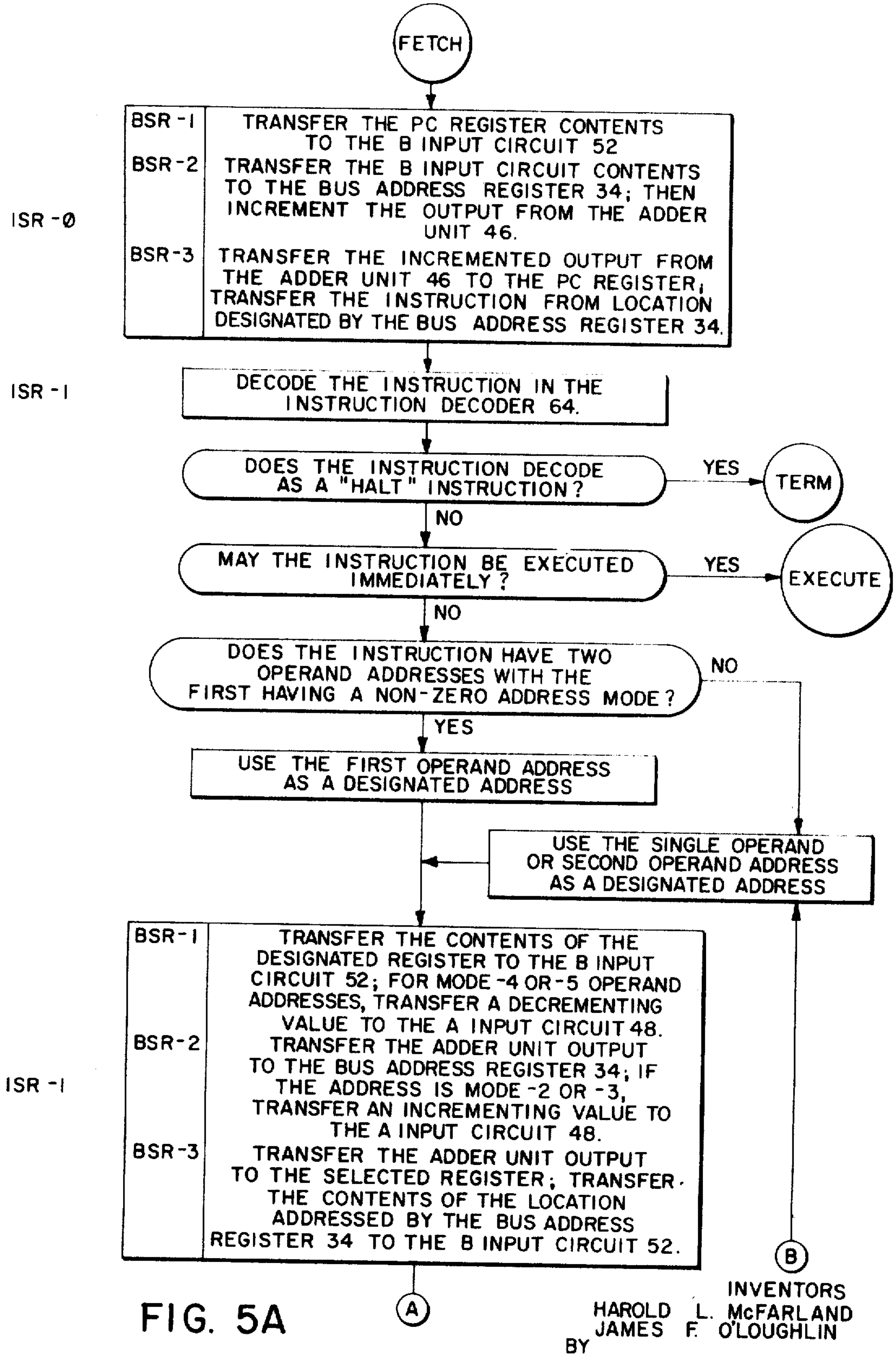
FIGS. 5A, 5B, and 5C are a flow diagram of a "fetch" cycle executed by the processor unit of FIG. 2.
Figure 5B:
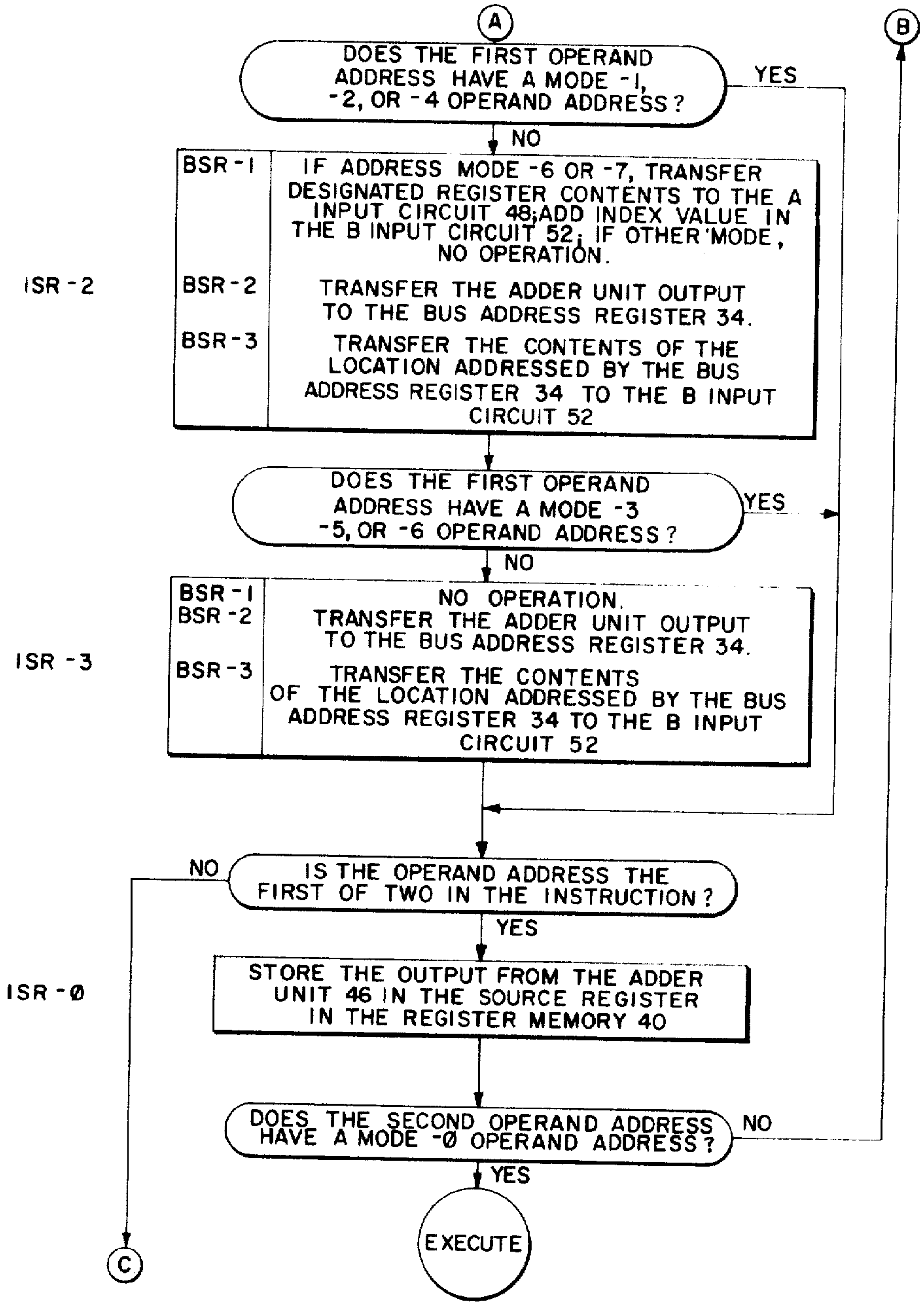
Figure 5C:
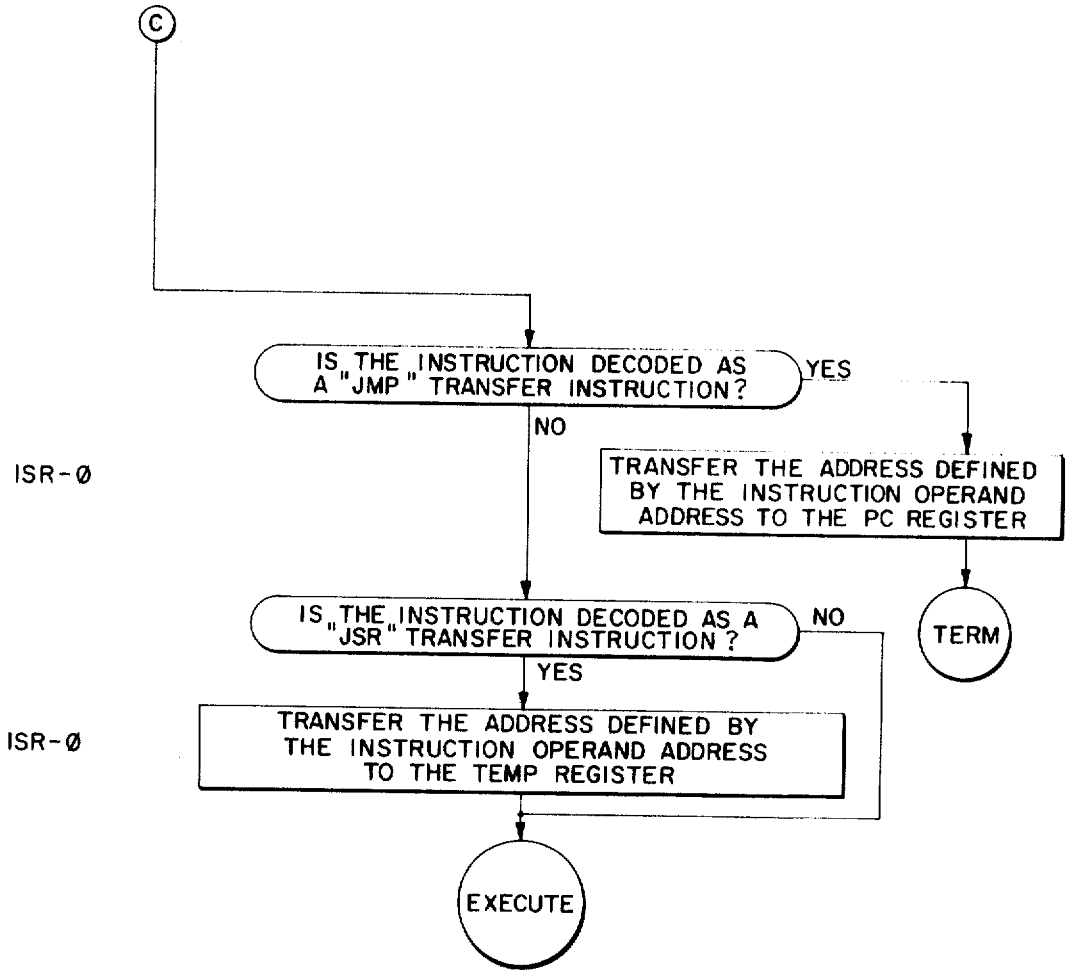
Figure 6A:
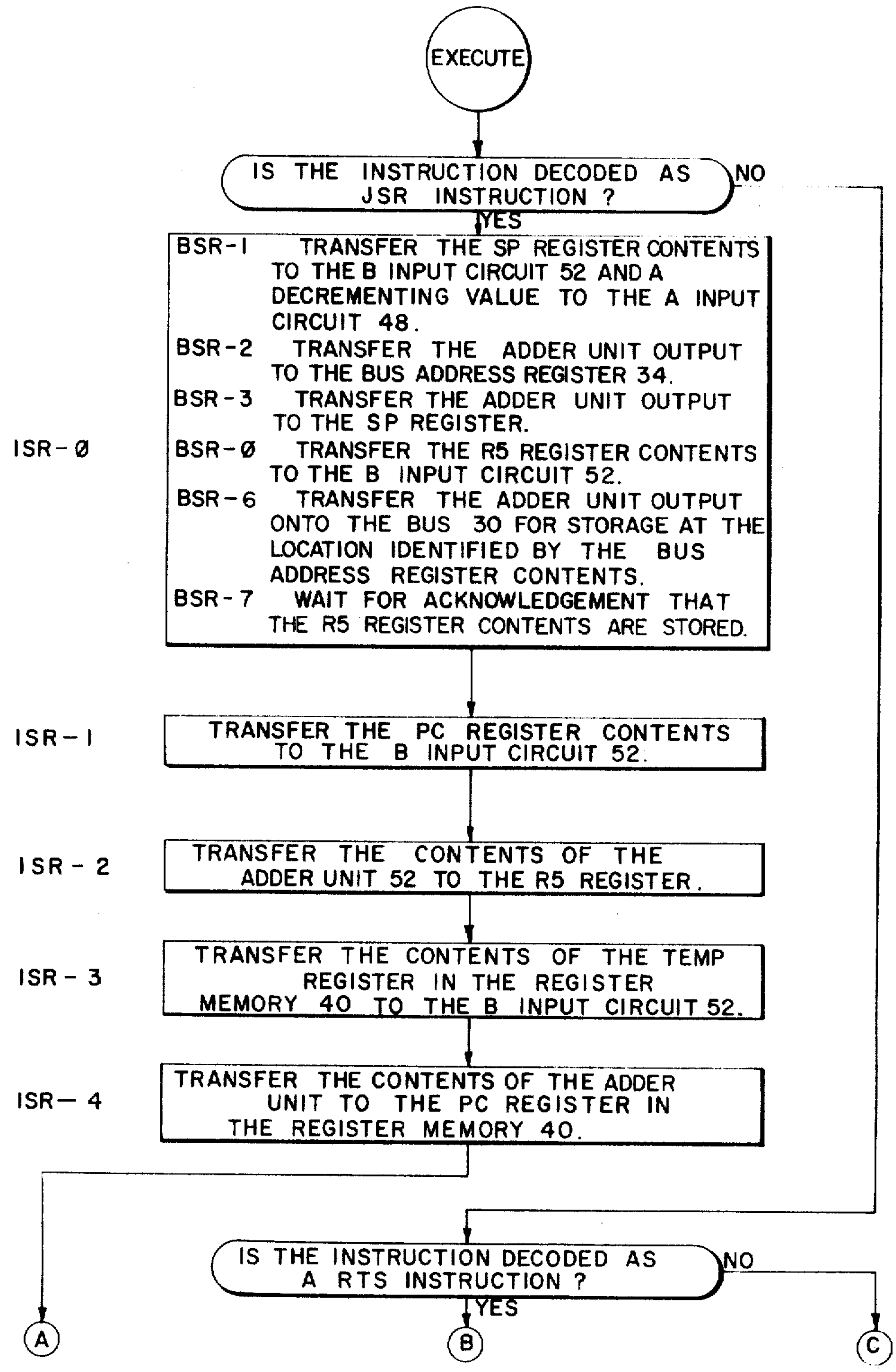
FIGS. 6A, 6B, 6C, 6D, and 6E are a flow diagram of an "execute" cycle executed by the processor unit of FIG. 2.
Figure 6B:
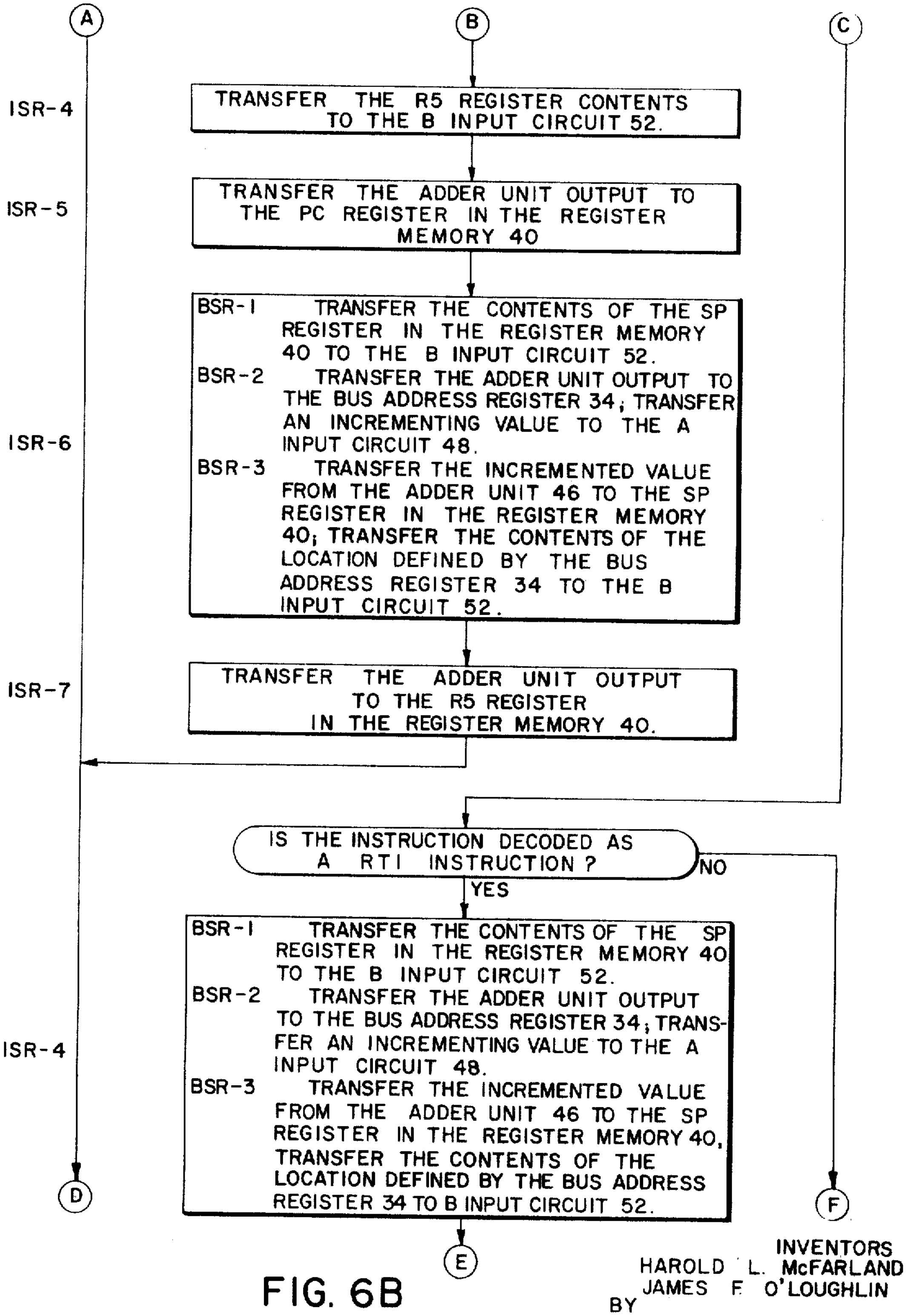
Figure 6C:
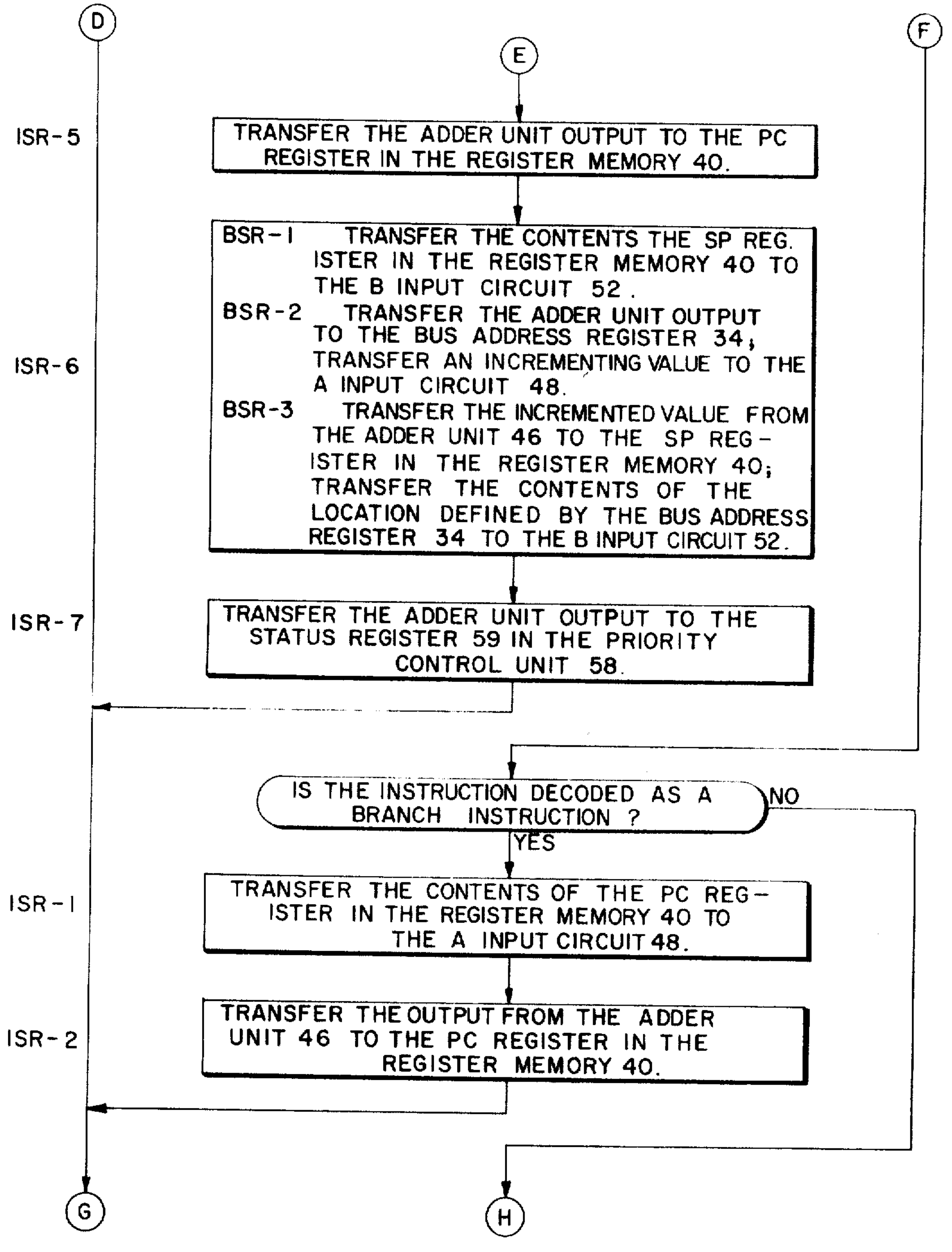
Figure 6D:
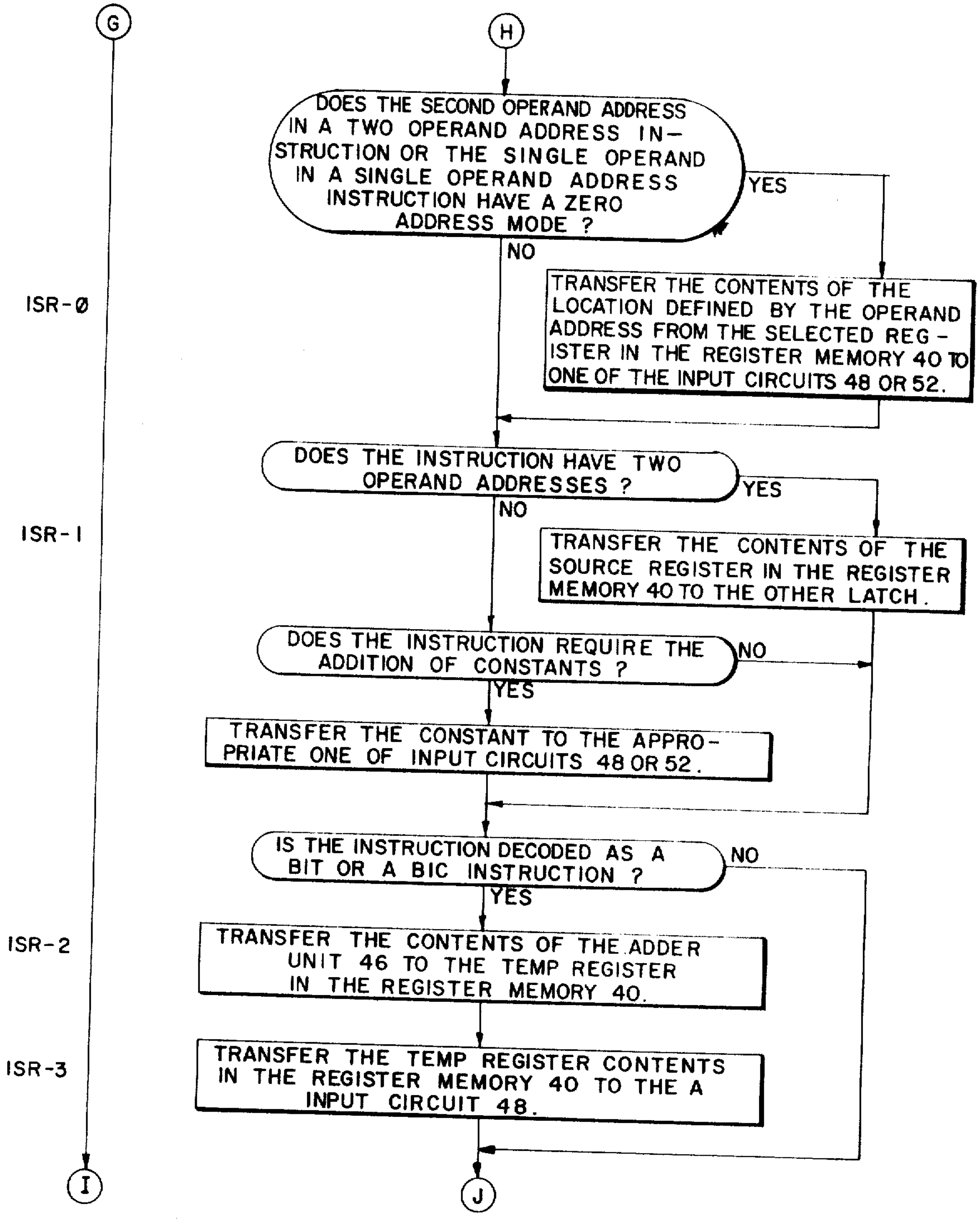
Figure 6E:
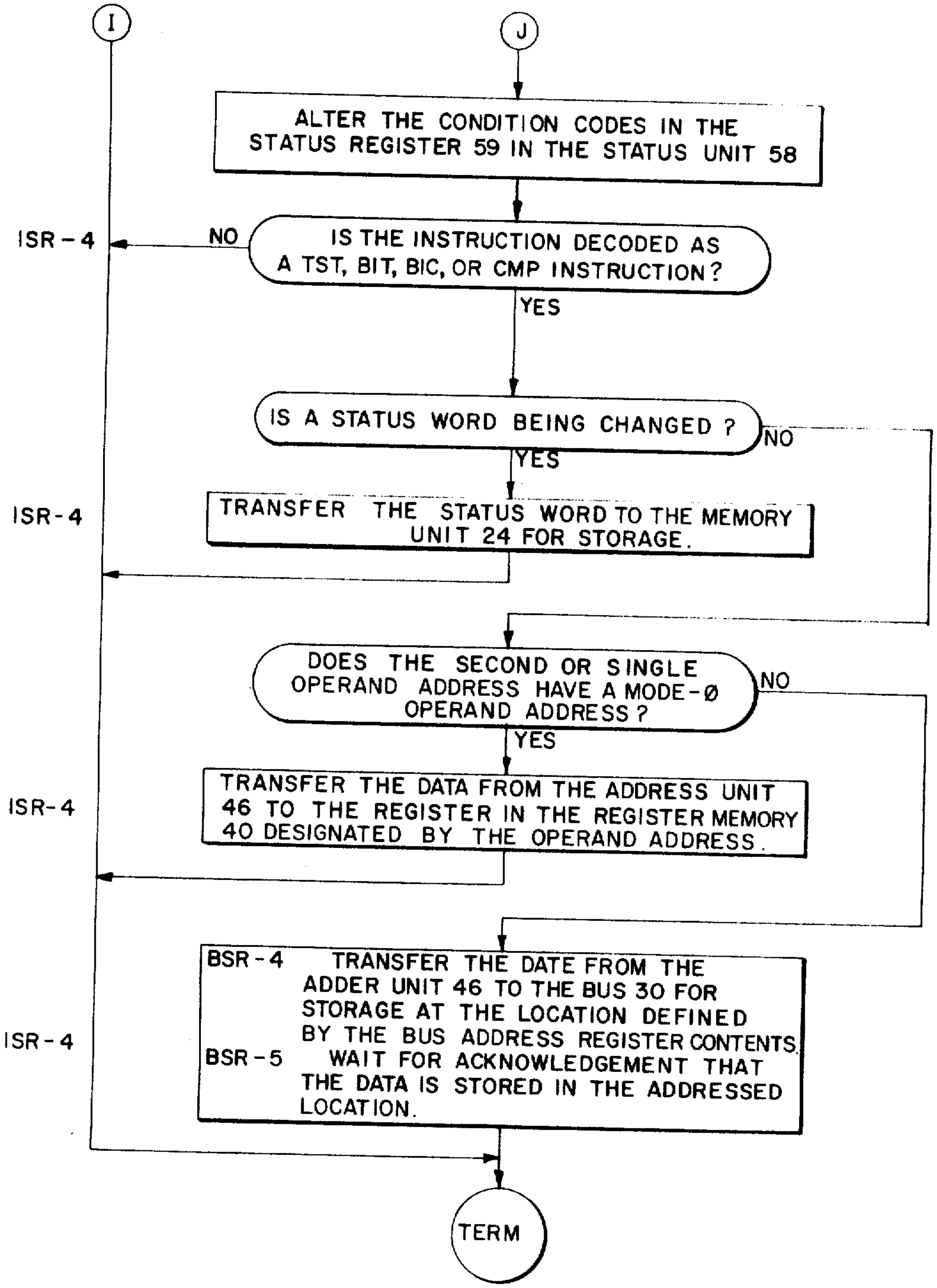
Figure 7:
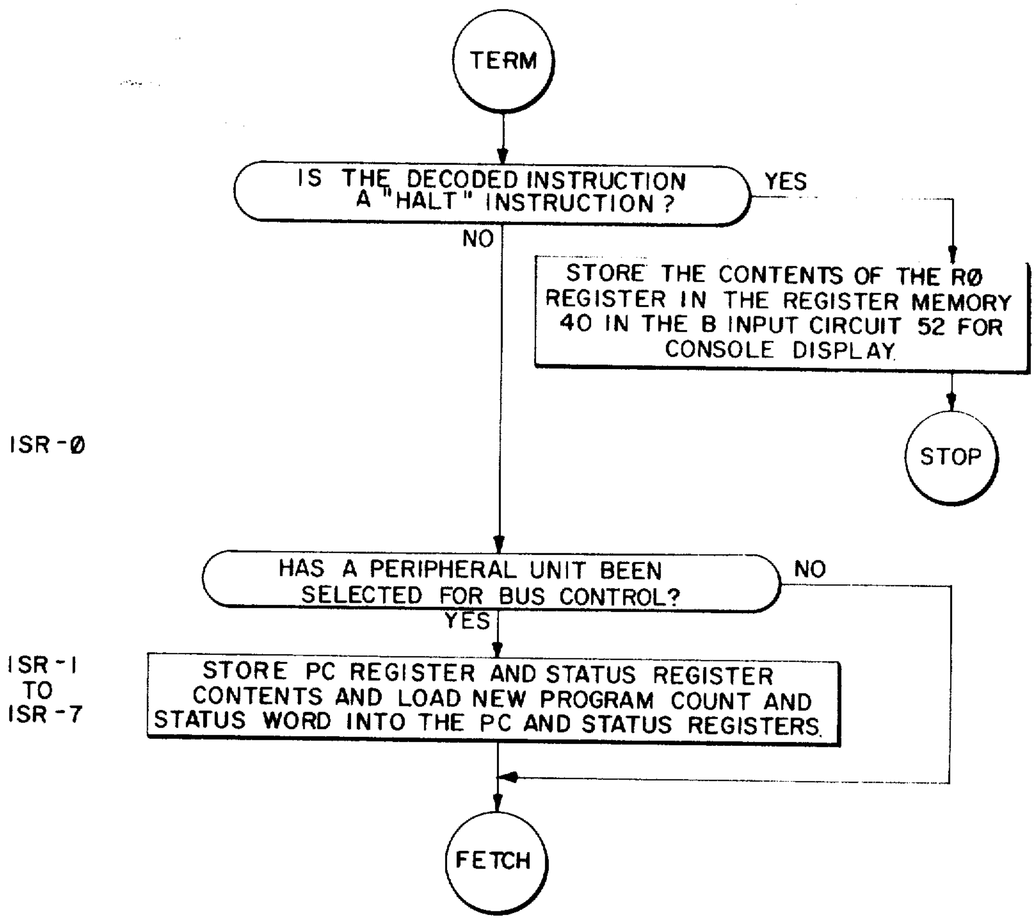
FIG. 7 is a flow diagram of a "term" cycle executed by the processor unit of FIG. 2.

System response to each operand address mode, described with reference to the flow diagrams for the processor unit "-fetch", "execute" and "term" operating cycles in FIGS. 5, 6, and 7, is generally as follows:

TABLE II

| OPERAND ADDRESS MODE | FUNCTION |
|---|---|
| 0 | *Direct addressing*; selected register contains data. |
| 1 | *Indirect addressing*; the selected register contains a data address. |

TABLE II – Continued

| | |
|---|---|
| 2 | *Indirect addressing with automatic increment;* the selected register contains a data address which is incremented after the data is obtained. Using the R7 register provides *immediate addressing.* |
| 3 | *Double deferral addressing with automatic increment;* the selected register contains an intermediate address which stores a data address. Using the R7 register provides *absolute addressing.* |
| 4 | *Indirect addressing with automatic decrement;* the selected register contents are decremented to define a data address. |
| 5 | *Double deferred addressing with automatic decrement;* the selected register contents are decremented to define an intermediate address which stores a data address. |
| 6 | *Indexed addressing;* the next instruction comprises an index value added to the selected register contents. The sum is a data address. Utilizing the R7 register provides *relative addressing.* |
| 7 | *Deferred indexed addressing;* the next instruction comprises an index value which is added to the selected register contents. The sum is an intermediate address which stores a data address. Using the R7 register provides *deferred relative* |

It is now apparent that the three operand address mode bits and the three register selection bits provide many types of addressing. *Direct addressing* is provided by a MODE–0 operand address when the selected register contains data. An instruction with a MODE–1 operand address provides *indirect addressing* because the selected register contains a data address.

MODE–2 and MODE–4 operand addresses provide modified forms of *indirect addressing* with the selected register contents constituting a data address before being incremented or after being decremented with these modes respectively. These two operating modes are used when data is stored in contiguous memory locations. MODE–2 operand addresses cause consecutive data transfers with memory locations with ascending addresses; MODE–4 operand addresses, with descending addresses. These address modes are used in complementary fashion when the SP register is selected with one being used for transfers to the memory unit; and the other, for transfers from the memory unit. For example, a "last-in, first-out" list in the memory unit can be formed by moving data to the list with MODE–4 operand addresses while obtaining data with MODE–2 operand addresses when a reference list address is stored in the SP register. Last-in, first-out lists are known in the art.

*Immediate addressing* obtained when a MODE–2, operand address selects the PC register, uses the contents of the following instruction location as data.

Whenever data is to be located in sequence but is stored in random memory locations, instructions with MODE–3 and MODE–5 operand addresses provide *double deferral* addressing. These operand addresses have the same functions and cause the same response as MODE–2 and MODE–4 operand addresses with one exception. Data addresses, rather than data, are stored in the contiguous memory locations. When an instruction with a MODE–3 operand address selects the PC register, the memory location following the instruction contains a data address; this is *absolute addressing.*

MODE–6 and ME–7 operand addresses provide *indexed* and *deferred indexed addressing,* respectively. Two special cases occur when the PC register is selected in the operand address; these are *relative* (MODE–6) and *deferred relative* (MODE–7) addressing. *Relative addressing* specifies the data address with respect to the instruction location while *deferred relative addressing* specifies the intermediate location address with respect to the instruction location.

Therefore, an instruction with a 6-bit operand address can define a data location in a variety of ways. This addressing flexibility is obtained with each instruction containing an operand address. Different instructions or groups of instructions for limited types of addressing are not required to obtain this broad range of addressing capabilities.

c. Processor Unit Operation

With this general understanding of the significance of the address modes and register selection bits, it is possible to discuss the various operating cycles produced by the processor unit 22 in detail.

i. "Fetch" Cycle

FIG. 5 is a flow diagram for the "fetch" cycle which obtains an instruction from the memory unit 24 (FIG. 2) and transfers the data defined by the operand addresses, if any, to the processor unit 22. Each cycle is characterized by a timing signal identified by a mnemonic ISR or BSR and generated by circuitry described with reference to FIG. 9.

When the processor unit 22 (FIG. 2) begins operation, an extended ISR–0 state comprising three BSR states is generated by the control unit 60. The contents of the PC register are transferred to the B input circuit 52 during a BSR-1 state. Unless specified otherwise, an unused input circuit produces a zero output. With the A input circuit 48 producing a zero output, the program count passes through the adder unit 46 without modification to the bus address register 34 during a first portion of a BSR–2 state. An incrementing value applied to the A input circuit 48 produced a new program count at the output of the adder unit 46 during a second portion of the BSR–2 state. After this new program count is moved to the PC register in the register memory 40, during a first portion of a BSR–3 state, the instruction stored at the location addressed by bus address register 34 is transferred into the instruction register 62 during a second portion of the BSR–3 state.

When the ISR–0 state is completed, the timing unit 66 and general control unit 68 produce an ISR–1 state for decoding the instruction in the instruction decoder 64 and for making several decisions. If the instruction is HALT or other available control instruction, the processor unit 22 diverts to a "term" cycle diagrammed in FIG. 7. If the instruction does not include an operand address, such as the RTI, RTS and BEQ instructions, or if it contains a single operand address which is a MODE–0 operand address, it can be executed immediately. With these instructions, the processor unit 22 diverts to the "execte" cycle shown in FIG. 6.

If the processor unit 22 is not diverted to either the "execute" or "term" cycles, the necessary steps to obtain the information defined by the operand address or addresses are taken. If the first of two operand addresses in the instruction is not a MODE–0 operand address, it is selected as a designated address. Otherwise the second or single operand address becomes the designated address.

After the proper operand address has been designated, the control unit 60 produces an extended ISR–1 state comprising three BSR states. The contents of the register identified in the designated operand address are moved to the B input circuit 52 during the BSR–1 state. A decrementing quantity is coupled to the A input circuit 48 to decrement the value applied to the B input circuit 52 if the designated operand address is a MODE–4 or –5 operand address. In any case, the output from the adder unit 46 is transferred to the bus address register 34 during the BSR–2 state. If the designated operand address is a MODE–2 or –3 operand address, an incrementing quantity is applied to the A input circuit 48 during a second portion of the BSR–2 state. After the output from the adder unit 46 is returned to the register defined in the designated operand address during a first portion of the BSR–3 state, the contents of the location addressed by the bus address register 34 are transferred to the B input circuit 52. The BSR–3 state is extended until this transfer has been completed.

With MODE–1, –2, or –4 operand addresses, the B input circuit 52 contains data and no further operations are necessary.

With MODE–3, –5, –6 or –7 operand addresses, the B input circuit 52 contains an address, and the processor unit 22 enters an ISR–2 state which includes three BSR states. No operation occurs in the BSR–1 state unless the operand address is a MODE–6 or –7 operand address. Either mode caused the PC register to be implicity selected and its contents incremented during the ISR–1 state so that the B input circuit contains an index value at the end of the ISR–1 state. During the ISR–2 state, the contents of the register identified in the operand address are moved to the A input circuit 48 for addition to the index value. After the output from the adder unit 46 is transferred to the bus address register 34 during the BSR–2 state, an extended BSR–3 state is used to move the contents of the location addressed by the bus register 34 to the B input circuit 52.

When the ISR–2 state terminates, the B input circuit 52 contains data if the operand address is a MODE–3, –5 or –6 operand address. No additional addressing operations are necessary. With a MODE–7 operand address, the B input circuit contains a data address; and an ISR–3 state is used. No operations occur during the BSR–1 state. The data address is transferred directly to the bus address register 34 during the BSR–2 state. An extended BSR–3 state moves the data to the B input circuit 52. Upon the termination of the ISR–3 state, all addressing related to the designated operand address has been completed.

Once an operand address has been decoded, the B input circuit contents are transferred through the adder unit 46 to a SOURCE register in the register memory 40 if the designated operand address is a first of two operand addresses. Once this transfer is made, the remaining operand address is decoded by repeating the preceding ISR–1, –2, and –3 states if it is not a MODE–0 operand address. If it is a MODE–0 operand address, the processor unit 22 diverts to the "execute" cycle. In all other cases, the processor unit 22 terminates the "fetch" cycle with some preliminary transfers if the instruction is a JMP or JSR instruction.

Both the JMP and JSR instructions modify the "fetch" cycle response to their operand addresses. When the last ISR state required to decode the operand address is started, the control unit 60 modifies the BSR–3 state to omit the transfer of the addressed contents to the B input circuit 52. This modification occurs because the output from the adder unit 46 is the address for the first instruction to be used after the JMP or JSR instruction has been completed. With a JMP instruction, the instruction address is moved to the PC register during a ISR–0 state. Then the processor unit 22 diverts to the "term" cycle. With a JSR transfer instruction, the initial subroutine instruction address is stored temporarily in the TEMP register during an ISR–0state. The processor unit 22 then diverts to the "execute" cycle of FIG. 6 as it also does if the instruction is neither a JMP nor JSR instruction.

ii. "Execute" Cycle

The response of the processor unit 22 during the "execute" cycle is determined by the instruction. Therefore, processor unit operation varies for each instruction as described with reference to FIG. 6.

JSR Instruction

Referring to FIG. 6A, the control unit 60 initially produces an extended ISR–0 state in response to a JSR instruction and transfers the contents of the SP register (the R6 register) in the register memory 40 to the B input circuit 52. A decrementing value is applied to the A input circuit 48 simultaneously during the BSR–1 state. The decremented value from the adder unit 46 is moved to the bus address register 34 and to the SP register in the register memory 40 during the BSR–2 and BSR–3 states respectively. When the BSR–3 state is finished, the bus address register 34 addresses a vacant location in the group of contiguous locations defined as block 94 in FIG. 10. During the following BSR–0 and –4 states, the contents of the register defined by bits 6, 7 and 8 in the instruction are transferred through the B input circuit 52 to the vacant location. As previously indicated, any register in the register memory 40 could be identified by the JSR instruction. During the BSR–5 state, the processor unit 22 waits until the R5 register contents have actually been stored and then terminates both the BSR–5 state and ISR–0 states. Hence, the R5 register contents are transferred into the memory unit 24 during the ISR–0 state by decrementing the SP register contents to define a vacant address in the block 94.

During the following ISR–1 state, the PC register contents are transferred to the B input circuit 52 and then to the R5 register during the ISR–2 state. The addrėss for the first subroutine instruction is transferred from the TEMP register, where it was stored during the "fetch" cycle, to the B input circuit 52 during the ISR–3 state. This new program count is then moved to the PC register during the ISR–4 state. When the ISR–4 state is finished, the PC register contains the address for the first instruction in the subroutine; the R5 register, the address for the next instruction in the operating routine and the last entry to the block 94 comprises the contents of the R5 register which existed during the "fetch" cycle. This completes the operations required by the JSR instruction so the processor unit 22 completes the "term" cycle. During the next "fetch" cycle, the first instruction in the subroutine is obtained from the block 90 in the memory unit 24 of FIG. 5.

RTS Instruction

Each subroutine terminates with an RTS instruction identifying the same register as its related JSR instruction. When the R5 register is always designated in the JSR instructions, the RTS instruction has a fixed format. Therefore, a programmer always uses the same instruction as the last instruction in a subroutine Referring to FIGS. 6A and 6B the ISR–4 and ISR 5 states generated by the control unit 60 transfer the R5 register contents through the B input circuit 52 to the PC register. During an extended ISR–6 state and following ISR–7 state, the processor unit 22 moves the last entry in the block 94 (FIG. 10) to the R5 register.

More specifically, during the BSR–1 state in the ISR–6 state, the SP register contents are transferred to the B input circuit 52. As the SP register of decremented before transferring data to the block 94 in the memory unit 24, the SP register contains the address for the last entry. This address is transferred to the bus address register 34 during a first portion of the BSR–2 state. An incrementing value, applied to the A input circuit 48 during a second portion of the BSR–2 state, returns the incremented address to the SP register during the BSR–3 state. At the end of the BSR–3 state, the B input circuit 52 contains the last entry from the block 94. This entry is transferred to the R5 register during the ISR–7 state. When the ISR–7 state is finished the PC register contains the address of the operating routine instruction following the JSR instruction. The R5 register contains the last entry from the block 94; and the SP register the address of the next filled location in the block 94. During the next "fetch" cycle, the instruction in the operating routine which follows the JSR instruction is obtained from one of the blocks 86, 90 or 92 in the memory unit 24 shown in FIG. 10.

RTI Instruction

As fully described in the previously identified Pat. application Ser. No. 21,957whenever the processor unit 22 relinquishes its control over the data processing system after a peripheral request to interrupt the operating routine is granted, the program count and status word for the interrupted operating routine are moved to the next two available memory locations in the block 94. Then the status word and program count for the interruption routine are moved to the status register 59 and the PC register respectively.

All interruption routines terminate with the same RTI instruction. When the instruction is decoded, the processor unit 22 uses ISR–4, –5, –6 and –7 states to transfer the interrupted operating routine program count and status word to the PC register and status register 59. Referring to FIGS. 6B and 6C, an extended ISR–4 state utilizes BSR–1, –2, and –3 states to obtain the operating routine program count from a location in the memory unit 24 defined by the SP register. After the SP register contents are moved to the bus address register 34 during the BSR–1 and BSR–2 states, an incrementing value, applied to the A input circuit 48, produced an incremented value for return to the SP register during the BSR–3 state. This state is also used to transfer the last entry in the block 94 (the program count) to the B input circuit 52 for transfer to the PC register during the ISR–5 state. An extended ISR–6 state with three BSR states similarly increments the SP register contents and obtains the status word for transfer to the status register 59 during the ISR–7 state. After these operations are finished, the processor unit 22 diverts to the "term" cycle.

Branch Instruction

When a branch instruction is decoded, the offset value in bits 0through 7 is stored in the B input circuit 52 during the "-fetch" cycle. During the "execute" cycle shown in FIG. 6C, the processor unit moves the PC register contents to the A input circuit 48 during the ISR–1 state. A new program count, constituted by the incremented program count and offset sum from the adder unit 46, is transferred to the Pc register during an ISR–2 state. When the processor unit generates the next "-fetch" cycle, the instruction at the new location is obtained.

Operand Address Instructions

If the instruction is not decoded as a JSR, RTS, RTI or Branch instruction, it is executed by transferring data to the A or B input circuits 48 or 62. If the second of two or a single operand address is a MODE–0 operand address, the contents of the register defined by the operand address are transferred to one of the input circuits 48 or 52 as shown in FIG. 6D.

Figures 8, 10:
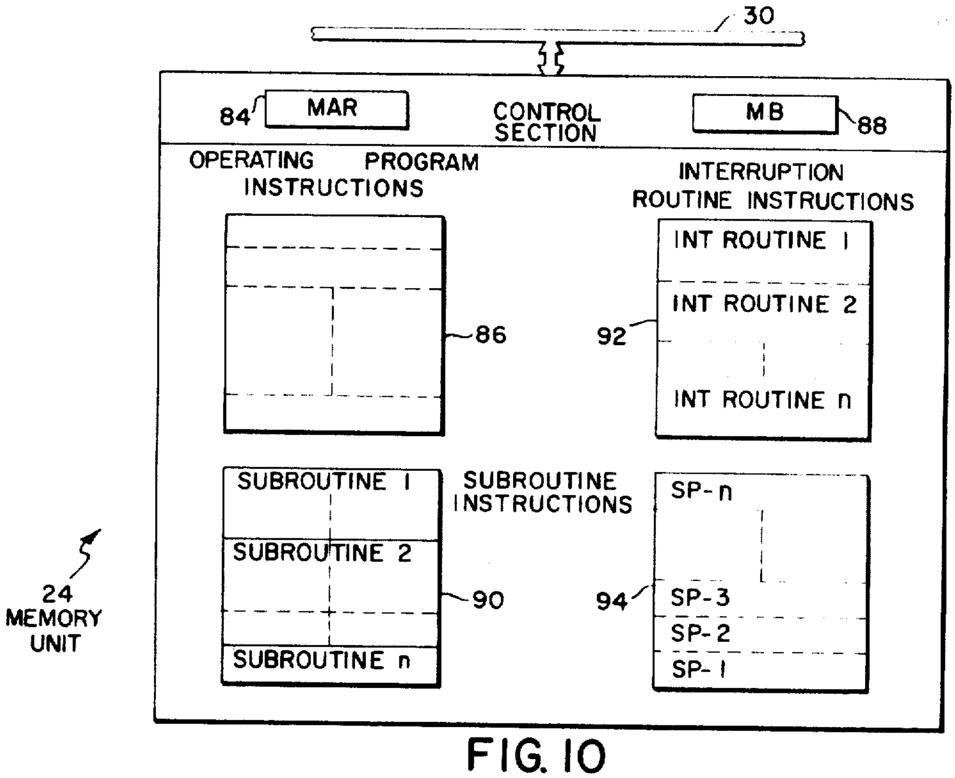
FIG. 8 provides information useful in understanding the transfer of data and instructions in the processor unit of FIG. 2.
FIG. 10 illustrates an embodiment of the memory unit shown in FIG. 1.

The selected input circuit depends upon the instruction and the address mode and is shown in FIG. 8. For example, data defined by a MODE–0 operand address as the second operand address in the instruction is transferred to the B input circuit 52 by an ADD instruction. Data defined by a MODE–0 operand address in a NEG instruction is transferred to the A input circuit 48.

Referring again to FIG. 6D, the processor unit moves the SOURCE register contents (i.e., the data identified by the first operand address) to one of the input circuits in accordance with the information in FIG. 8 if the instruction has two operand addresses. Data retrieved in response to single operand address instructions is transferred to one input circuit. Constants are then moved to the other input circuit, if required. For example, data in the B input circuit 52 is modified by loading the A input circuit 48 with the incrementing or decrementing value for INC or DEC instructions.

If the instruction is a BIT or BIC instruction, extra operations are required to obtain the logical AND result. A logical OR combination is performed first with the complements of the data identified by the operand addresses and then the result is complemented to obtain the logical AND result. Specifically, the adder unit output contains the result of the OR operation. This result is moved through the TEMP register to the complementing input until the A input circuit 48 during ISR–2 and ISR–3 states as shown in FIG. 6D to provide the final AND result.

An ISR–4 state is used to modify the condition codes, the N, V, C and Z bits in a status word, as required, after the various instructions have been performed. If the instruction is a TST, BIT, BIC or CMP instruction, the necessary information is transferred to the status word, the processor unit uses an ISR–4 timing state to store the new status word in the memory unit.

If a status word is not to be changed and the second of two operand addresses or the single operand address is a MODE–0operand address, the output from the adder unit 46 is transferred to the designated register. For other modes, the adder unit output is moved according to the bus address register contents. Therefore, a BSR–4 state moves data onto the bus 30. Then the processor unit waits until data storage is acknowledged during a BSR–5 state before starting a "term"-cycle.

Therefore, processor unit operation during an "execute" cycle depends on the specific instruction. The resulting timing states are described in detail with reference to FIG. 9.

III. "Term" Cycle

The final operating cycle for the processor unit 22 is the "-term" cycle generally diagrammed in FIG. 7. If the decoded instruction is a HALT instruction, the contents of a register, such as the R0 register containing information relating to the reason for the HALT instruction, are transferred through the B input circuit 52 for display by the console unit 35. Then processor unit 22 operation stops. Otherwise, the processor unit 22 looks to see if any bus request signals from the status unit 58 exist. In the data processing system shown in FIG. 1, bus request signals represent a request by a peripheral device to transfer information over the bus 30 to the processor unit. In other systems, this signal might be a priority interrupt signal: circuits for generating such signals are well known.

Referring to FIG. 7, the processor unit 22 responds to a peripheral unit request with sufficient priority by utilizing six ISR states (ISR–1 and ISR–7) to save the program count for the next instruction address and the status word. Then a new instruction address and status word are transferred to the PC register, and the status register 59. When these steps are completed, the processor unit proceeds to a "fetch" cycle to obtain the first instruction in the interruption routine. If no bus request signal or equivalent signal exists, the "term" routine is completed and the processor unit 22 branches to the "-fetch" cycle to retrieve the next instruction. Details related to a specific embodiment of the system shown in FIG. 1 are in the previously identified U.S. Pat. application Ser. No. 24,636.

IV. Summary Of Processor Unit Operation

As shown in FIGS. 5, 6 and 7 the processor unit 22 uses three basic cycles: "fetch," "execute" and "term" cycles. During the "fetch" cycle, an instruction is obtained from the memory unit and decoded. If the instruction contains one or two operand addresses, the data is obtained and stored in the processor unit 22. Then the processor unit 22 is diverted to the "term" or "execute" cycle depending upon the instruction. During the "execute" cycle, the processor unit 22 operates on data and transfers resultant data to final locations defined by the operand addresses. The processor unit 22 examines the data processing system during a "term" cycle to respond to certain conditions by relinquishing control over the bus 30 until the requesting device returns control. After the "-term" cycle is complete, the processor unit 22 produces another "fetch"

d. Timing Unit

As discussed with reference to FIGS. 5, 6 and 7, each operation cycle in the processor unit 22 is defined by a time state signal generated by the timing unit 66 of FIG. 2. Each timing state depends upon several factors including the previous timing state, the instruction and conditions in the processor unit 22. A detailed understanding of how each timing state is produced is not necessary to appreciate this invention. However, the circuitry and timing signals shown in FIGS. 9A and 9B in conjunction with the flow diagrams of FIGS. 5, 6 and 7 enable a more thorough understanding and will permit a person of ordinary skill in the art to produce specific control circuitry necessary to provide the described processor unit operation.

Figure 9A:
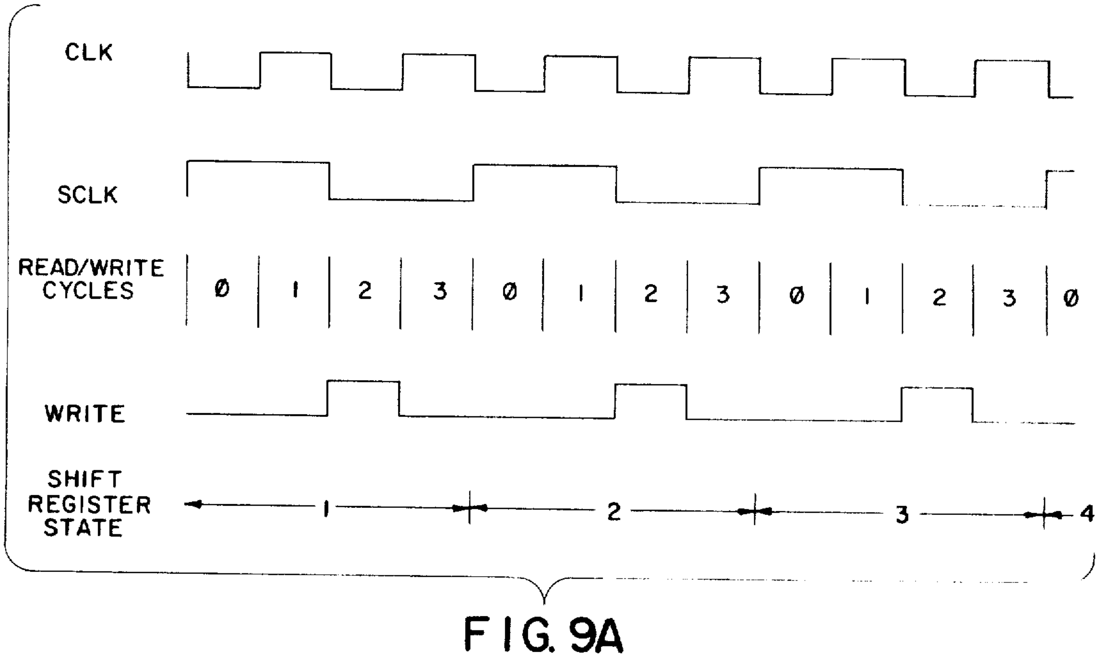
FIGS. 9A and 9B depict a timing unit for the processor unit of FIG. 2.
Figure 9B:
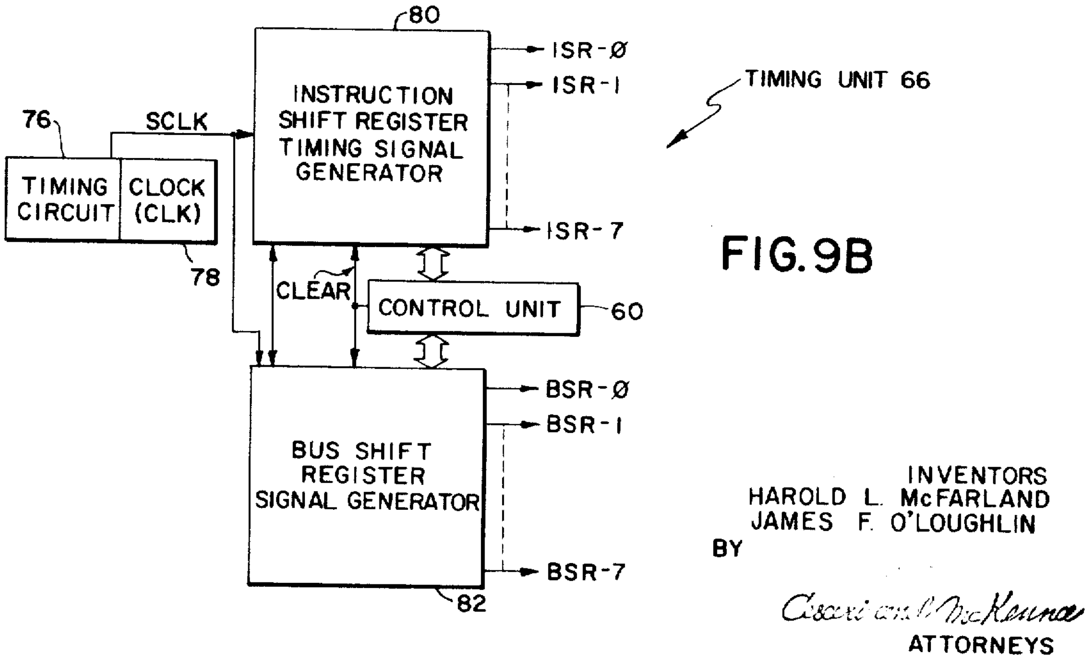

Referring to FIG. 9B, the timing unit 66 comprises a timing circuit 76, a clock 78 and two signal generators 80 and 82. Fig 9A shows the relationship of the CLK signals or pulses from the clock 78 and the SCLK signals or pulses from the timing circuit 76. Each change in the CLK signal defines a read or write cycle boundary with a specific read or write cycle being determined by the relationship of the SCLK and CLK signals. As shown in FIG. 9A, four read/write cycles, R/W–0 R/W–1, R/W–2 and R/W–3, are generated during each SCLK cycle from the timing circuit 76. The R/W–2 cycle is always a write cycle while the clock 78 may be stopped during an R/W–3 cycle to extend a BSR state as when data is transferred to or from the processor unit. Each group of four R/W cycles together with other signals from the control unit 60 defines a shift register state represented by a signal on one of the output conductors from one of the generators 80 or 82.

More specifically, the SCLK signals from the timing circuit 76 and signals from the control unit 60 are applied to the instruction shift register signal generator 80 and the bus shift register signal generator 82. The generator 80 produces ISR signals while generator 82 produces BSR signals. A CLEAR signal applied to one of the generators produces a "zero" state. Otherwise, each generator normally sequences from one state to another with the specific sequences necessary to operate the processor unit 22 being shown in FIGS. 5, 6, 7 and 8. These FIGS. illustrate how each timing state depends upon prior conditions and when the sequence may be modified.

e. Memory Unit

As previously indicated, many responses by the processor unit 22 require transfers with the memory unit 24. One embodiment of a memory unit and a typical organization is shown in FIG. 10. Addresses from the bus register 34 are coupled to a memory address register (MAR) 84. If instructions or data are being transferred to the memory unit, then they are transferred through the memory buffer (MB) 88 to the designated locations. Instructions or data in memory locations are transferred from the designated memory locations through the memory buffer 88 onto the bus 30.

The memory unit 24 is divided into blocks of contiguous memory locations, which store related instructions in sequential order, and random locations. For example, the memory locations which comprise block 86 store operating program instructions in sequence. These are the locations normally addressed in sequence by the PC register. If a JSR instruction is located in the block 86, it contains an address for one location in a block 90 which stores the various subroutine instructions. Interruption routine instructions are stored in contiguous memory locations which comprise a block 92. Finally, a block 94 is used to store the PC register contents saved during the execution of JSR instructions or interrupt routines, which also cause status words to be stored in the block 94. As previously noted, locations in the block 94 are usually identified by the contents of the R6 register when it is used as an SP register.

Other blocks of memory locations may also be used for similar or other purposes. A "block" has no fixed length, but is merely used to define a group of contiguous memory locations used for a specific purpose.

f. Arithmetic Unit

Figure 11:
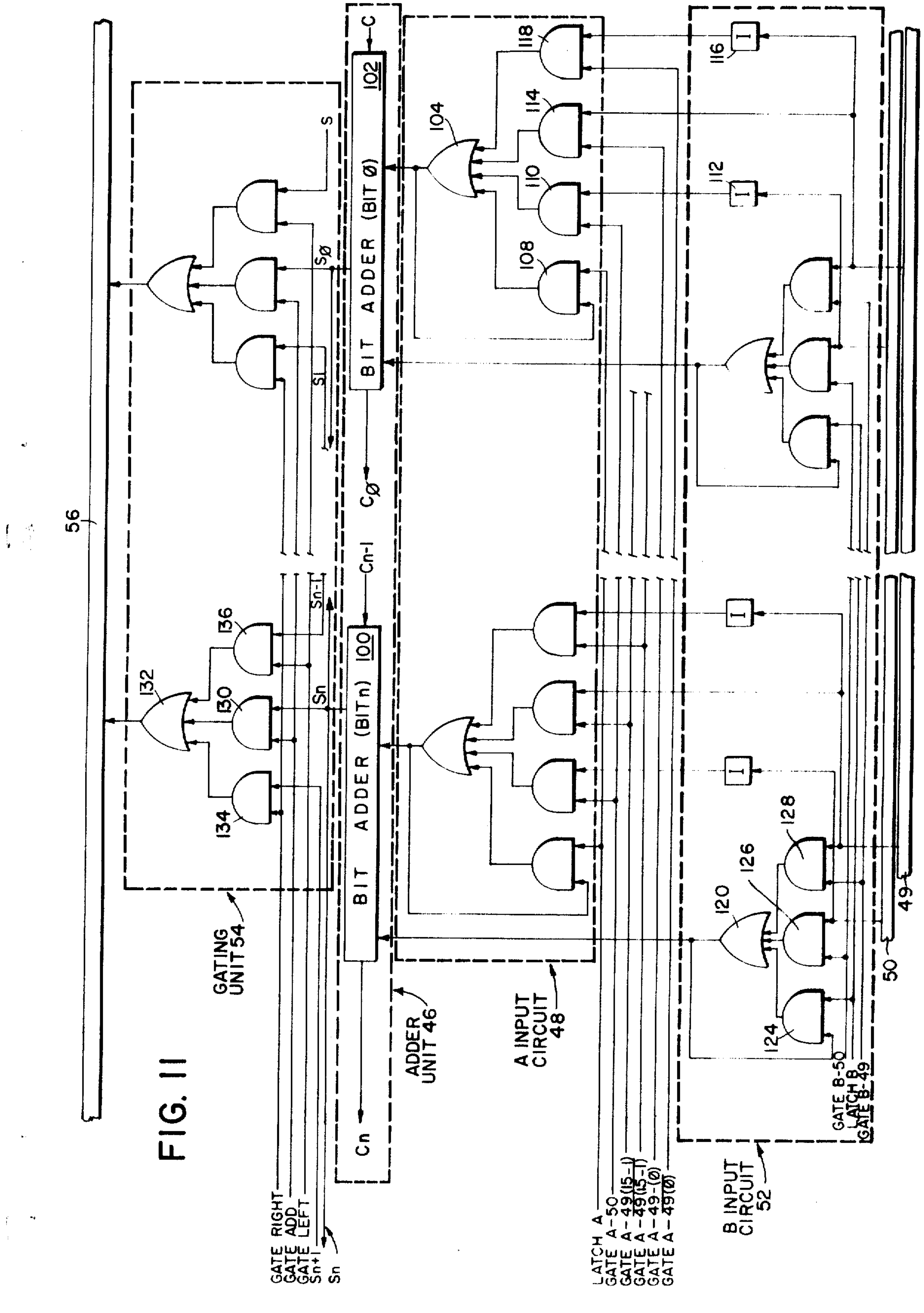
FIG. 11 is a schematic of an arithmetic unit for the processor unit of FIG. 2.

Referring to FIG. 11, the adder unit 46 comprises a plurality of bit adders, bit adders 100 and 102 being shown by way of example. Each adder has three input sources: the A and B input circuits 48 and 52, respectively, and a carry output from the preceding bit adder. For example, the signal $C_{n+1}$ is applied to the bit adder 100. Each bit adder generates a sum and carry output such as the $S_n$ and $C_n$ signals from the bit adder 100.

The A input circuit 48 comprises an input latch circuit for each bit adder. More specifically, the A input circuit 48 for the bit adder 102 (BIT0) comprises an OR circuit 104. Its output is transferred to one input of the bit adder 102 and is latched by coupling it through an AND circuit 108. This AND circuit is normally enabled by a LATCH A signal from the data path control unit 70 shown in FIG. 2. The LATCH A signal is dropped to disable the AND circuit 108 and change the output from the A input circuit 48. An AND circuit 110, enabled by a GATE A-$\overline{50}$ signal from the data path control unit 70, transfers the signal on the bus 50 through an inverter 112 to the bit adder 102. A signal on the bus 49 from the register memory 40 is coupled through an AND circuit 114 by a GATE A-49(Ø) signal. The signal is also coupled through an inverter 116 and an AND circuit 118 by a GATE A-$\overline{49(Ø)}$ signal. GATE A-49(1-15) and GATE A-$\overline{49(1-15)}$ signals are applied to AND circuits analogous to the AND circuits 114 and 118, respectively, to transfer the remaining signals on the bus 49 or their respective inverted signals to the other bit adders.

Using two sets of gating signals for the A input circuit 48 permits signals from the B input circuit 52 to be incremented or decremented. When the data path control unit 70 produces the GATA-49(Ø) and GATE A-$\overline{49(Ø)}$ signals simultaneously, a "one" is added to the B input circuit contents. An incrementing value of "two" is produced by additionally transferring a "one" to the carry input of the bit adder 102. If the arithmetic control unit 70 produces all four GATE A-49 signals simultaneously the two's complement of (+1) is applied to the adder unit 46. This decrements the B input circuit contents by "one." Producing the GATE A-49(1-15) and GATE A-$\overline{49(1-15)}$ signals simultaneously decrements the B input circuit contents by "two."

Three input signals control the B input circuit 52 and the circuitry for $BIT_n$ is typical An OR circuit 120 provides the B input to the bit adder 100 and is latched by coupling its output through an AND circuit 124 normally enabled by a LATCH B signal. This signal is disabled to change the output from the B input circuit 52. A signal on the bus 50 is gated through an AND circuit 126 by a GATE B-50 signal while a signal on the bus 49 is gated through an AND circuit 128 by a GATE B-49 signal.

Each sum output from the adder unit 46 is coupled through the gating unit 54 by one of three signals. When a GATE ADD signal is generated by the arithmetic control unit 70 (FIG. 2) an AND circuit 130 couples the $S_n$ output from the bit adder 100 through an OR circuit 132 onto the bus 56. A GATE RIGHT signal applied to an AND circuit 134 moves the signal ($S_{n+1}$) through the OR circuit 132 and shifts each signal from a bit adder one position to the right. A similar shift to the left by one position is obtained by producing a GATE LEFT signal. This signal enables an AND circuit 136 to transfer the $S_{n+1}$ signal through the OR circuit 132 onto the bus 56. Hence, these signals provide two shifting operations which become rotating operations if the first and last bit adders are interconnected through the gating circuit 54.

g. Register Memory

Figure 12:
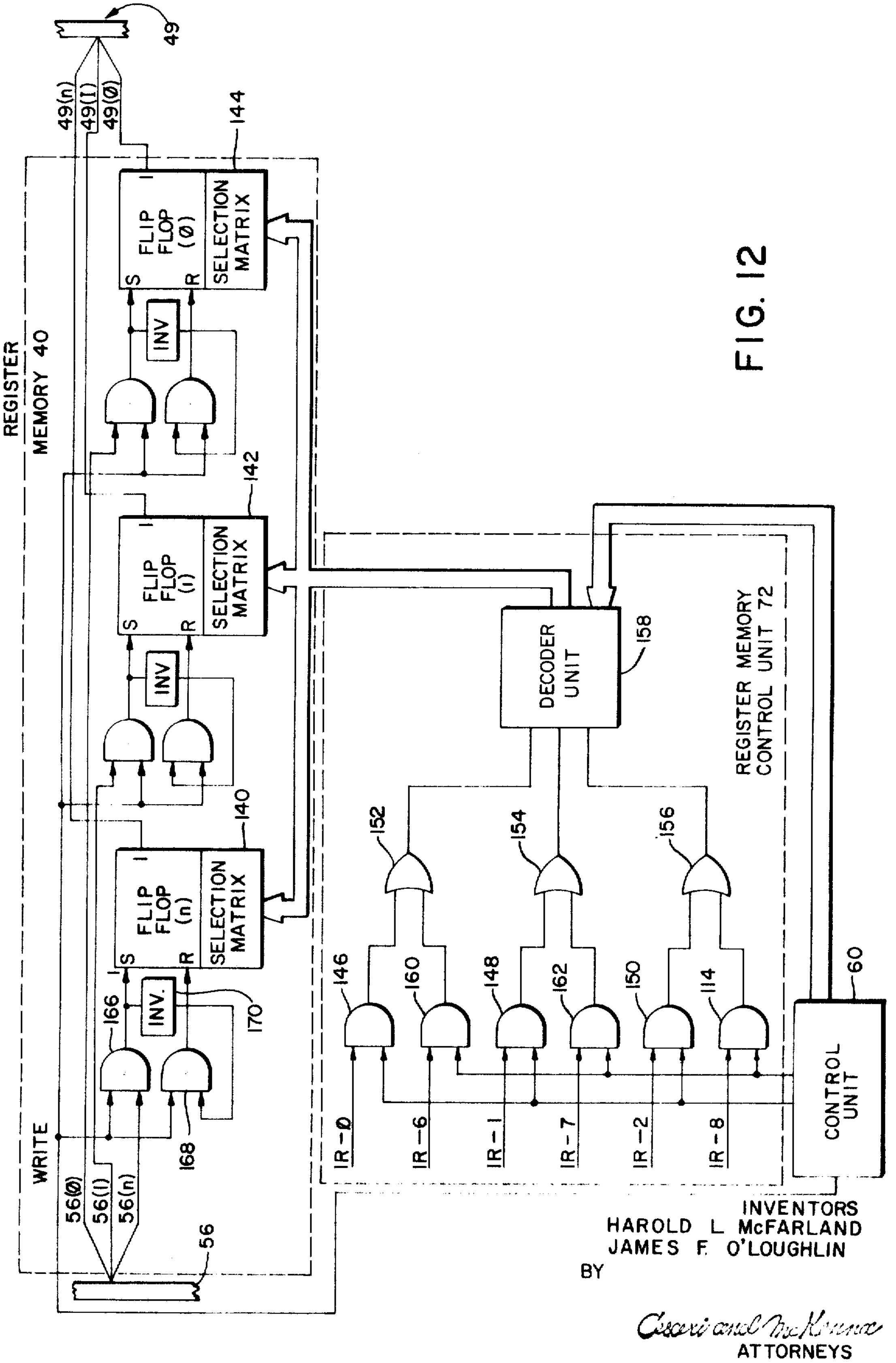
FIG. 12 is a schematic of one register memory control unit and register memory adapted for use in the processor unit of FIG. 2.

FIG. 12 illustrates one embodiment of the register memory 40 and the register memory control unit 72. In this particular embodiment, the register memory 40 comprises a plurality of flip-flop circuits which each comprise a plurality of selective flip-flops and a selection matrix. For example, a flip-flop circuit 140 places a $BIT_n$ on the bus 49 for any register in the register memory 40 while flip-flop circuits 142 and 144 store $BIT_1$ and $BIT_0$, respectively for each register. Therefore, one flip-flop circuit stores a corresponding bit for each register and contains as many individuals flip-flops as there are registers. If the processor unit 22 responds to 16-bit words, the register memory 40 comprises sixteen flip-flop circuits with each circuit containing at least 10flip-flops to store an equivalent bit in the R0 through R7, SOURCE and TEMP registers.

A specific register in the register memory 40 is selected by decoding the appropriate register selection bits, the IR-0, IR-1 and IR-2 bits or the IR-6, IR-7 and IR-8 bits, and then selecting the appropriate flip-flop in each flip-flop circuit.

Register selection may also be obtained in response to other, internal signals from the control unit 60. Each register selection bit from the instruction register 62 (FIG. 2) is gated through a plurality of AND circuits in the register memory control unit 72 enabled by signals from the control unit 60.

When the control unit 60 enables AND circuits 146, 148 and 150, the IR-0, IR-1 and IR-2 signals are coupled through OR circuits 152, 154 and 156 to a decoder unit 158. The output from the decoder unit 158 energizes the selection matrix in each flip-flop circuit to select the proper flip-flop to permit input signals to be coupled thereto and output signals to be coupled therefrom. As a result, corresponding flip-flops in each flip-flop circuit are coupled to the bus 49. For example, if the R0 register is selected in an operand address, the first flip-flop in each flip-flop circuit is coupled to the bus 49. Therefore, signals on wires 49(0), 49(1) and 49($n$) represent $BIT_0$ $BIT_1$and $BIT_n$, respectively. The register identified by a first operand address or bits 6, 7 and 8 in a JSR instruction, is similarly obtained by enabling AND circuits 160, 162 and 164 to transfer the IR-6, IR-7 and IR-8 signals through the OR circuits 152, 154 and 156 to the decoder unit 158.

As one register is always selected, the contents of the selected register in the register memory 40 always appear on the bus 49 to the A and B input circuits 48 and 52. Register contents are changed when the control unit 60 produces a WRITE signal. The set and reset inputs for each selected flip-flop are coupled to the common set (S) and reset (R) inputs at the flip-flop circuits. These common set and reset inputs are coupled through identical writing circuits for each flip-flop circuit to the bus 56, the writing circuit for the flip-flop 140 being typical. The WRITE signal is applied to AND circuits 166 and 168 while the data representing $BIT_n$ on the wire 56($n$) from the bus 56 is applied to the AND circuit 166. If the signal on this wire is a logical "one," the selected flip-flop is set when the AND circuits 166 and 168 are enable to WRITE signal. The reset input is not energized because the output from the AND circuit 166 is coupled through an inverter 170 to the AND circuit 168. A logical "zero" on the wire 56($n$) energizes the AND circuit 168 to reset the selected flip-flop circuit 40.

3. Examples

The following examples illustrate processor unit response to some specific instructions. While the discussion for each example refers to a specific FIGURE, reference is also made to FIGS. 2, 5 through 8, 10 and 11.

a. MOV PC(2), R6(5)

Figure 13:
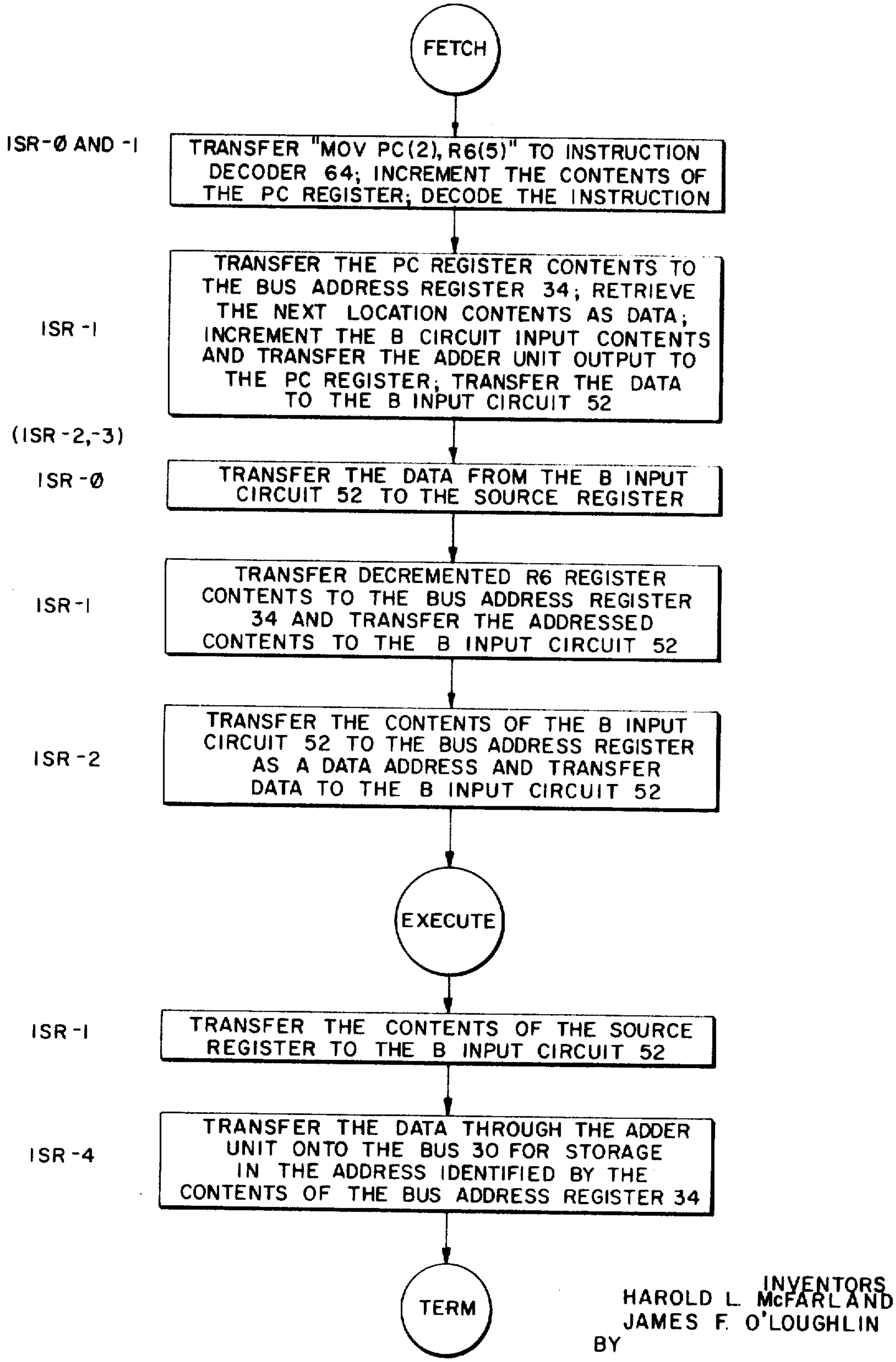
FIG. 13 illustrates processor unit response to a first exemplary instruction.
Figure 14:
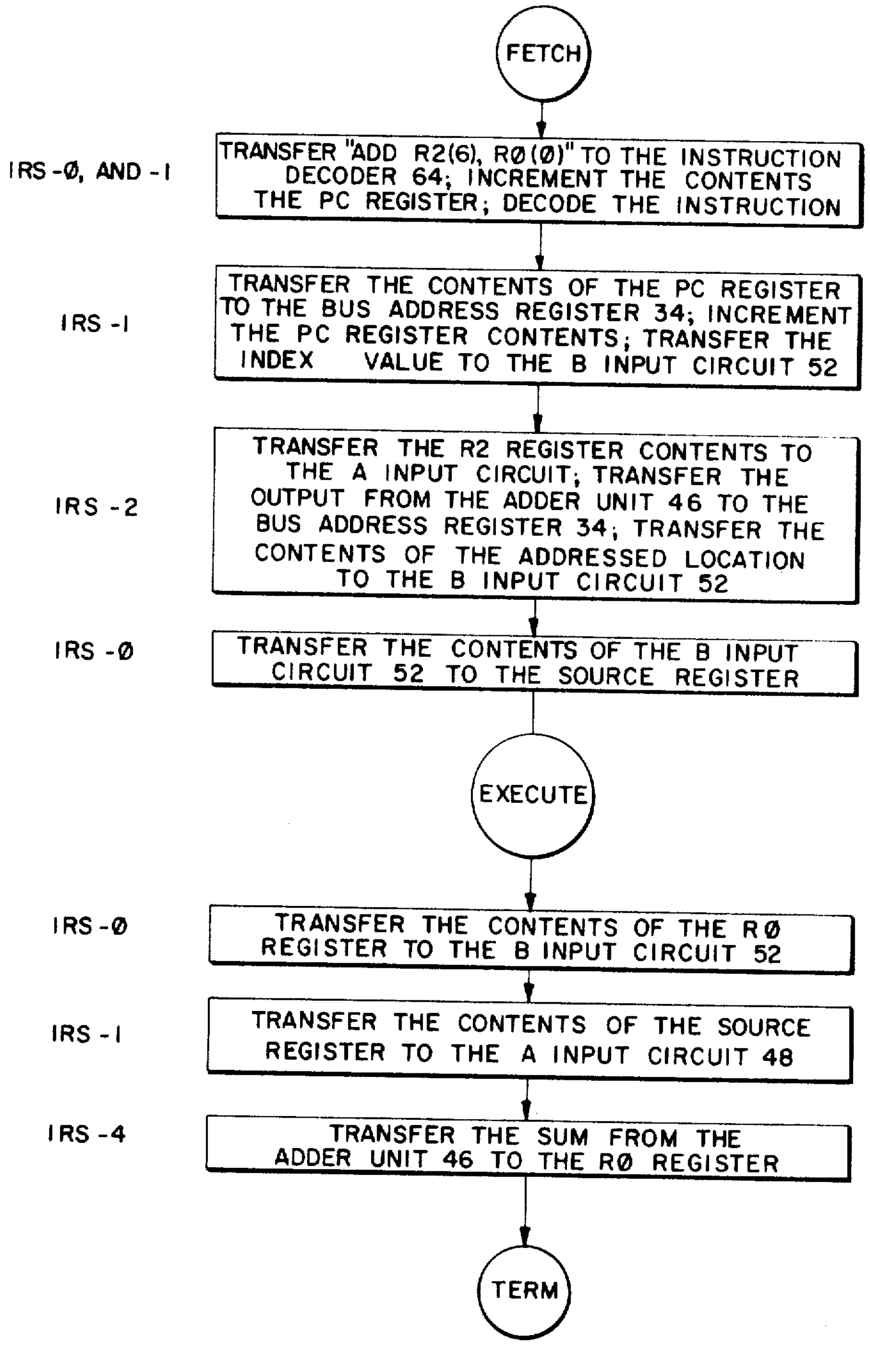
FIG. 14 illustrates processor unit response to a second exemplary instruction.

Processor unit response to a MOV instruction, represented by an octal number 012756 is shown in FIG. 13. This instruction uses *immediate addressing* to obtain data for transfer to a random location in the memory unit defined by *double deferred addressing*. Such an instruction might be used to transfer data to the memory unit. Assume that the memory unit (FIG. 10) and register memory (FIG. 2) are as follows:

TABLE III

| ADDRESS | CONTENTS | MEANING |
|---|---|---|
| Block 86 | | |
| 1543 | 012756 | MOV PC(2), R6(5) |
| 1544 | 2167 | DATA |
| Block 94 | | |
| 4151 | 1823 | RANDOM LOCATION |
| Register Memory 40 | | |
| R6 | 4152 | REGISTER CONTENTS |

During the "fetch" cycle (FIG. 5), the instruction is transferred to the processor unit when the PC register (FIG. 2) contains 1543. The instruction is transferred to the instruction decoder; then the PC register contents are incremented to 1544 by enabling the AND circuits 114 and 118 (FIG. 11) simultaneously. These steps occur during the ISR–0 and ISR–1 states.

As the first operand address is a MODE–2 operand address, the PC register contains a data address. This address (1544) is moved to the bus address register (FIG. 2) and then incremented to 1545 for return to the PC register during the ISR–1 state. The data, interleaved with the instructions, is transferred to the SOURCE register during the ISR–0 state. As this data is obtained by *immediate addressing*, the control unit 60 omits the ISR–2 and ISR–3 addressing states; and the processor unit is ready to decode the second operand address.

The second operand address is a MODE–5 operand address. Therefore, the data is going to be stored at a random location defined by an address stored in the block 94 (FIG. 10) and obtained by double deferred addressing. The processor unit uses the ISR–1 state to decrement the R6 (SP) register contents to 4151 and transfer the decremented contents to the bus address register 34 (FIG. 2) and back to the R6 register. A data address 1823, which is stored in the block 94 (FIG. 10) at location 4151, is moved to the B input circuit 52 and then to the bus address register 34 (FIG. 2) during ISR–1 and ISR–2 states. As shown in FIG. 5B, any data stored in the location 1823 is moved to the B input circuit during this last timing state. However, this data is not used and is destroyed during the "execute" cycle. Therefore, the processor unit terminates the "fetch" cycle. At this time the PC register contains 1545: the SOURCE register, the data 2167; and the bus register 34, the address 1823.

The processor unit then uses the "exectue" cycle (FIGS. 6D and 6E) to move the data in the SOURCE register to the B input circuit 52 (FIG. 2) in accordance with the rules outlined in FIG. 8. This transfer, which occurs during the ISR–1 state, destroys the previous contents of the B input circuit. An ISR–4 state is used to move the data to the random location 1823 identified by the bus address register contents. When this information is stored, the "execution" cycle terminates.

The processor unit analyzes the entire system during the "-term" cycle (FIG. 7). Assuming that no peripheral device has been selected, the instruction at memory location, which is defined by the PC register contents, is obtained during the next "fetch" cycle.

b. ADD R2(6), R0(0)

An ADD R2(6), R0(0) instruction uses *indexed addressing* to obtain an augend for addition to an addend obtained by *direct addressing* with the sum being stored in the same location. This instruction could be repeated to obtain several addends from tables or blocks of data for addition with the intermediate and final sums being stored in the register memory 40 (FIG. 2). Assume the memory unit (FIG. 10) and register memory are organized as follows:

TABLE IV

| ADDRESS | CONTENTS | MEANING |
|---|---|---|
| Block 86 | | |
| 1400 | 066200 | ADD R2(6), R0(0) |
| 1401 | 2134 | INDEX VALUE |
| Random Location | | |
| 4535 | 10765 | AUGEND |
| Register Memory 40 | | |
| R0 | 21654 | ADDEND |
| R2 | 2401 | ADDRESS |

When the PC register reaches 1400, the ADD instruction is transferred to the instruction decoder and the PC register; is incremented to 1401 during the ISR–0 and ISR–1 states of a "-fetch" cycle (FIG. 5). During the next ISR–1 state, the processor unit 22 moves the index value 2134 to the B input circuit 52 (FIG. 2) after the PC register is incremented to 1402. An ISR–2 state moves the R2 register contents, 2401, to the A input circuit 48. When both the A and B inputs are energized, the sum from the adder unit, 4535,is immediately available for transfer to the bus address register 34 during the ISR–2 state. Then the augend, 10765, in the addressed location, 4535, is moved through the B input circuit 52 for transfer to the SOURCE register during the ISR–0 state. When the "fetch" cycle terminates, because the second operand address in a MODE–0 address, the SOURCE register contains the augend 10765. All other information in the bus register 34 and B input circuit is not relevant.

With a MODE–0 operand address, the processor unit transfers the R0register contents 21654 to the B input circuit 52 during the ISR–0 state. When the SOURCE register contents, 10765, are transferred to the A input circuit 48 during the ISR–1 state, the sum, 32641, produced by the adder unit 46 for storage in the R0 register during the ISR–4 state. When the "execute" cycle terminates, the PC register contains 1402; the R0register, the sum 32641; the R2 register, then number 2401; the location 4535, the augend 10765. The addend, 21654, originally stored in the R0 register is replaced by the sum.

c. SUB R4(4), R0(1)

Figure 15:
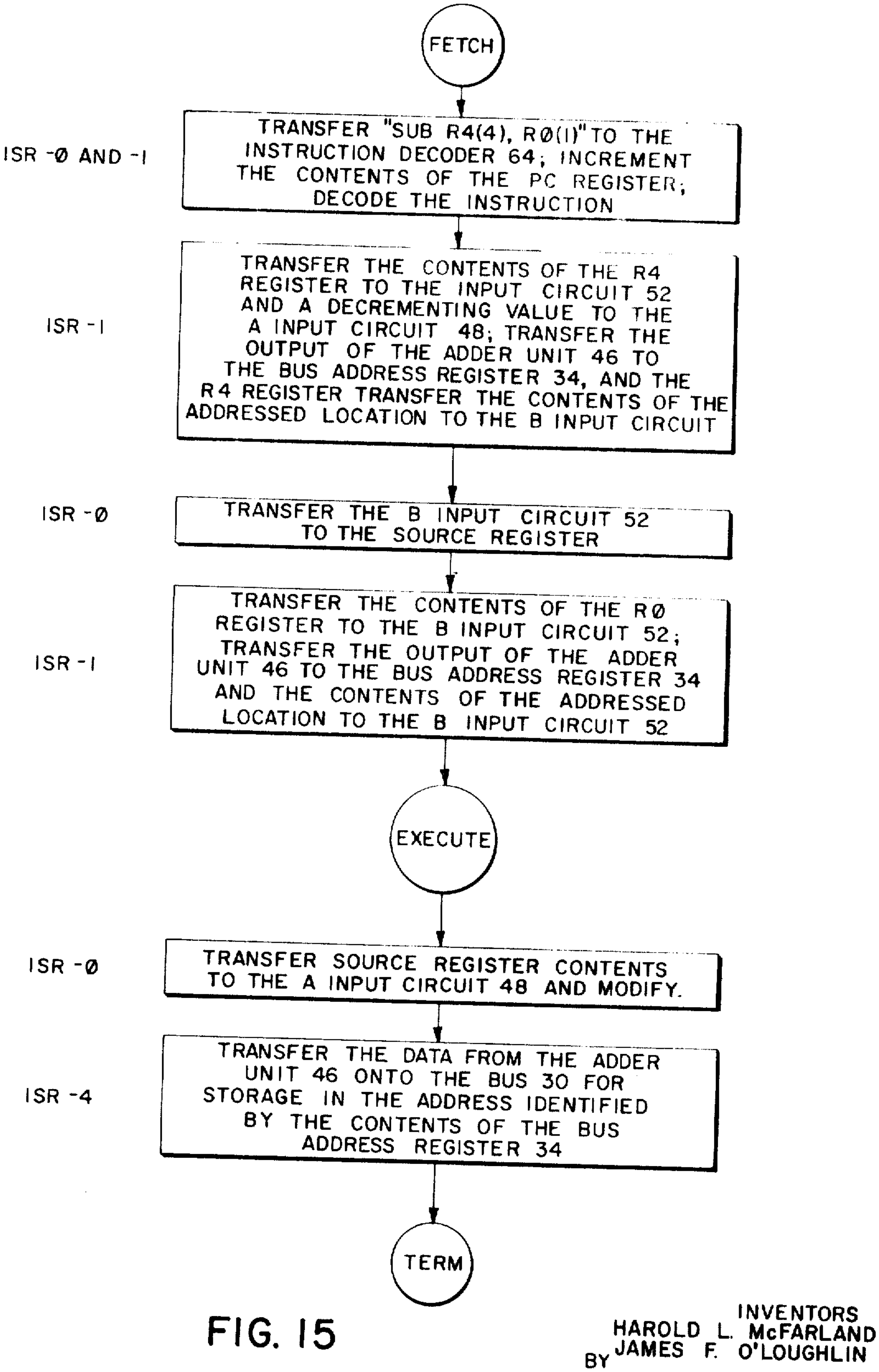
FIG. 15 illustrates processor unit response to a third exemplary instruction.

The processor unit responds to the SUB instruction 164410 as shown in FIG. 15 to subtract a subtrahend obtained by *indirectly addressing* a block of data locations from a minuend identified by indirect addressing. The remainder replaces the minuend in its storage location. Table V illustrates a typical contents for a memory unit and register memory.

TABLE V

| ADDRESS | CONTENTS | MEANING |
|---|---|---|
| Instruction block 86 | | |
| 1450 | 164410 | SUB R4(4), R0(1) |
| 2142 | 54032 | SUBTRAHEND |
| 2654 | 76243 | MINUEND |
| Register memory 40 | | |
| R0 | 2654 | MINUEND ADDRESS |
| R4 | 2143 | INITIAL CONTENTS |

When the PC register reaches 1450, the SUB instruction is transferred to the instruction decoder 64 and the PC register is incremented to 1451 during the ISR–0 and ISR–1 states of the "fetch" cycle. The processor unit uses an ISR–1 state to transfer the R4 register contents, 2143, defined in the first operand address, to the B input circuit 52 and obtain a decremented value 2142 by simultaneously generating all four GATE A–49 signals (FIG. 11). This same timing state is used to transfer the decremented value from the adder unit 46 (FIG. 2) to the bus address register 34. Then the subtrahend, 54032, is transferred to the B input circuit 52 for storage in the SOURCE register during the ISR–0 state.

As the second operand address is a MODE–1 operand address, the R0 register contains a data address, 2654. This address is transferred through the B input circuit 52 to the bus address register 34 during another ISR–1 state, and the minuend is stored in the B input circuit 52. Therefore, the B input circuit 52 and SOURCE register contain the minuend and subtrahend respectively when the "fetch" cycle is finished. The bus address register contains the minuend address and therefore defines the address for the remainder.

After the "fetch" cycle is finished, the processor unit 22 enters the "execute" cycle (FIG. 6) and transfers the two's complement, 23746, of the subtrahend, 54032, in the SOURCE register to the A input circuit 48 by generating both the GATE $A\text{–}\overline{49(1\text{–}15)}$ and GATE $A\text{–}\overline{49(0)}$ signals and forcing a carry into the bit adder 102. This step occurs during the ISR–0 state and the remainder, 22211, is immediately generated by the adder unit 46. Then the remainder is stored in the location 2654 during the ISR–4 state. Therefore, when the "execute" cycle is finished the PC register contains 1451; the storage location 2654, the remainder 22211; and the storage location 2142, the subtrahend 54032.

d. INC R0(3)

Figure 16:
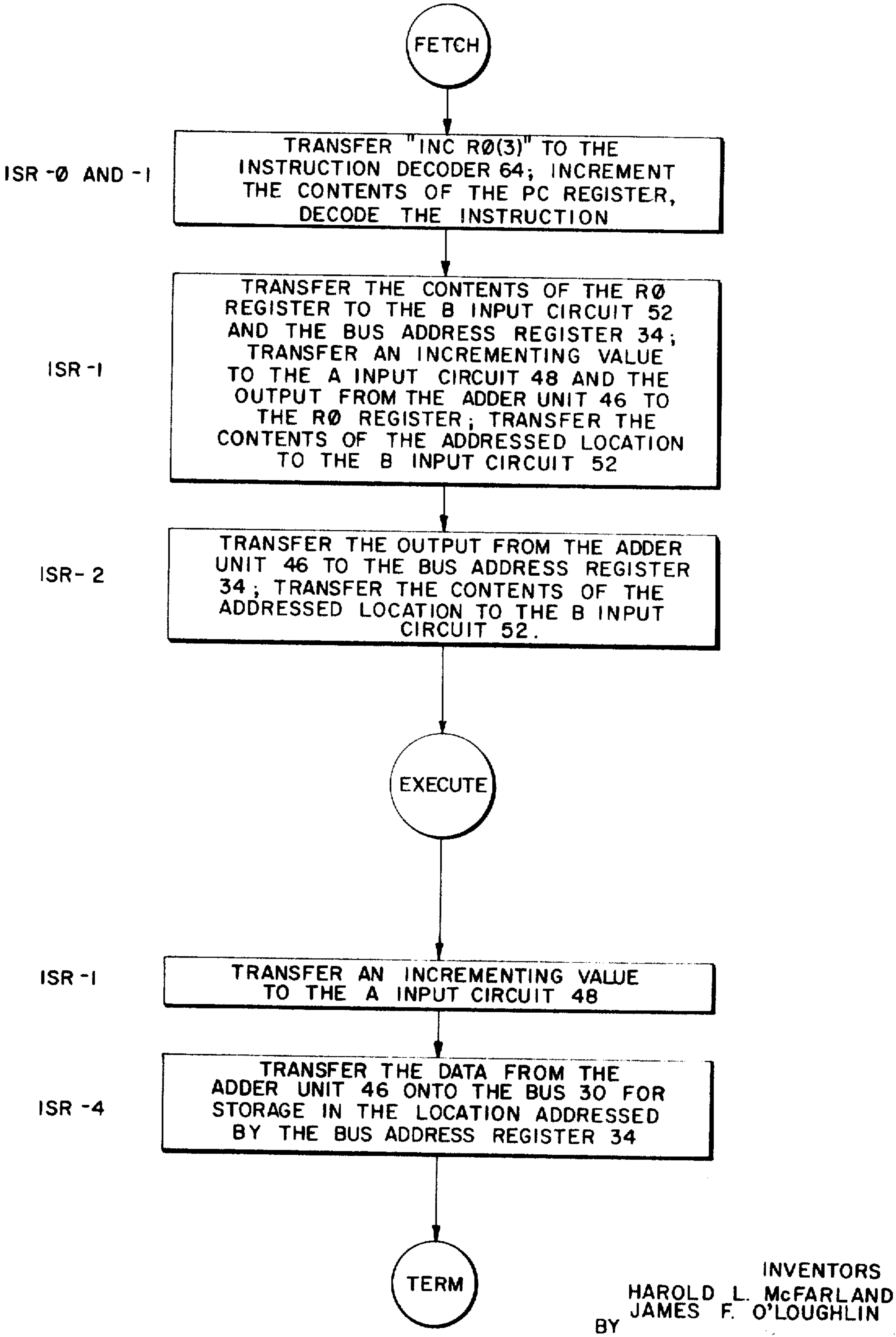
FIG. 16 illustrates processor unit response to a fourth exemplary instruction.

Processor response to single operand instructions can be understood by referring to FIG. 16. An INC instruction increments data, obtained by *double deferred addressing* in this example, by a predetermined value. Assume that the register memory and memory unit contain the following information:

TABLE VI

| ADDRESS | CONTENTS | MEANING |
|---|---|---|
| Memory Unit | | |
| 1502 | 005230 | INC R0(3) |
| 1876 | 2143 | DATA ADDRESS |
| 2143 | 76542 | DATA |
| Register memory 40 | | |
| R0 | 1876 | INITIAL CONTENTS |

When the PC register reaches 1502, the INC instruction is decoded, and the PC register is incremented to 1503 during the ISR–0 state of the "fetch" cycle (FIG. 5). After the R0 register contents, 1876, are transferred through the B input circuit 52 to the bus address register 34, they are incremented and returned to the R0 register during an ISR–1 state. The number 2143 in location 1876 is also transferred to the B input circuit 52 during this state; this number is a data address. During the ISR–2 state, this data address is moved to the bus address register 34; and the data, 76542, is moved to the B input circuit 52. When the "fetch" cycle terminates, the B input circuit 52 contains the data to be incremented; and the bus address register 34, the storage address for the result.

During the "execute" cycle, a carry is forced into the bit adder 102 for $BIT_0$(FIG. 11) to increment the data to 76543. This step occurs during an ISR–1 state and is followed by an ISR–4 state whereupon the data is stored in the memory location 2143 defined by the bus address register 34. When the "execute" cycle is finished, the R0 register contains 1877; the memory location 2143, the incremented value 76543; and the PC register, 1503. The instruction has therefore used *double deferred addressing* to obtain data, store modified data and automatically increment the R0 register contents.

e. DEC R7(7)

Figure 17:
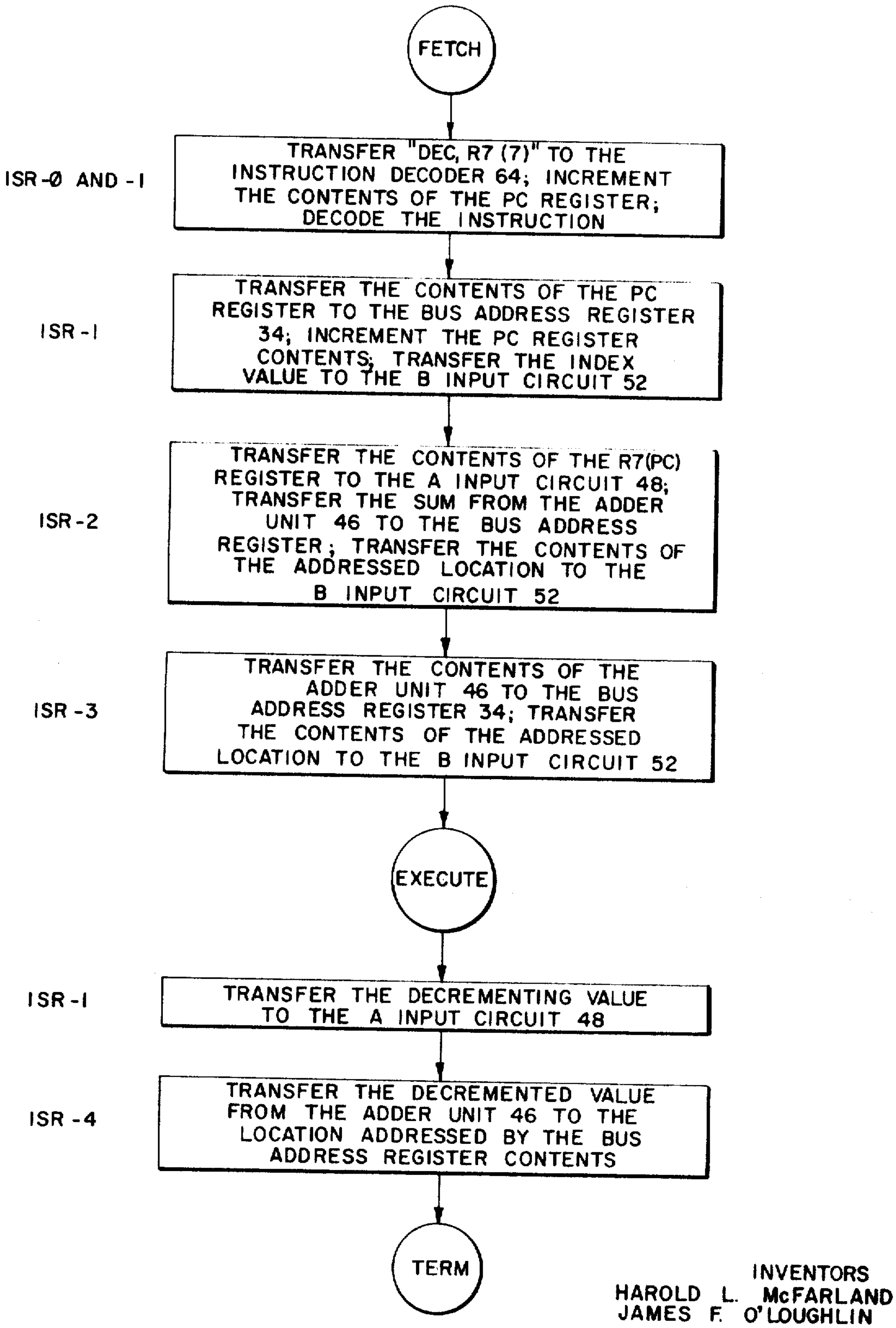
FIG. 17 illustrates processor unit response to a fifth exemplary instruction.

As a final example, FIG. 17 illustrates processor unit response to a DEC R7(7) instruction in which data, in a location defined by *deferred relative addressing*, is decremented by a predetermined value and stored in the location. Assume that the memory unit has the following organization:

TABLE VII

| ADDRESS | CONTENTS | MEANING |
|---|---|---|
| 1601 | 005377 | DEC R7 |
| 1602 | 1234 | INDEX VALUE |
| 3037 | 4163 | DATA ADDRESS |
| 4163 | 21776 | DATA |

When the PC register reaches 1601, the instruction is transferred to the instruction decoder 64 and the PC register is incremented to 1602. These steps occur during the ISR–0 and ISR–1 states of the "fetch" cycle. Then during another ISR–1 state, the PC register contents, 1602, are transferred to the bus address register 34, incremented to 1603 and returned to the PC register. In addition, the index value 1234 is moved to the B input circuit 52 because the instruction includes a MODE-7 operand address. As the PC (R7) register is selected by the operand address, the PC register contents, 1603, are transferred to the A input circuit 48 during the ISR-2 state. The sum, 3037, is a transferred to the bus address register 34, because it is a data address, during the ISR-3 state. The PC register is not incremented. Then the data address, 4163 is transferred to the B input circuit to complete the ISR-2 state. During the ISR-3 state, the data address 4163 is moved to the bus address register 34 and the data, 21776, is transferred to the B input circuit 52 to terminate the "fetch" cycle.

The decrementing value is applied to the A input circuit 48 during the ISR-1 state of the "execute" cycle. If the number is to be decremented by "one" all four GATE A-49 signals would be generated simultaneously. Assume that GATE A-49(1-15) and GATE $\overline{\text{A-49(1-15)}}$ signals are generated simultaneously. This causes the B input circuit contents to be decremented by "two" so the remainder 21774 which is generated by the adder unit 46 during the ISR-1 state is stored at the location 4163 defined by the bus address register 34 during the ISR-4 state. Therefore, when the "execute" cycle is completed, the location 4163 contains the decremented value 21774; the PC register, 1603 ; and the location 3037, the data address 4163.

These examples illustrate how processor unit responds to various instructions to obtain data from locations which are addressed in a variety of ways. The processor unit responds to the remaining instructions with operand addresses shown in FIG 3 similarly. It is apparent that the described 6-bit operand addresses permit extremely flexible addressing to a relatively large number of memory locations without adding significant programming complexity or circuit complexity. The number of addressed memory locations is only limited by the number of bits in a word, 16 bits in the specific examples. The various timing states are generally limited to those necessary to obtain and modify data so that the processor unit is not idle for any significant time.

Data can be easily obtained from blocks of contiguous memory locations, from a register, from random memory locations, or from locations within the instructions with equal facility. Therefore, the format and organization of data instructions is not restricted. A programmer can arrange them in the most advantageous way. Furthermore, the flexibility does not require any additional operation codes to further simplify programming and operation.

While the various addressing approaches have been described with reference to a specific data processing system configuration, it is obvious that other systems may be adapted to utilize this invention in order to obtain the same advantages. For example, a register memory could be formed in an internal or external memory unit. The timing and control circuits may be modified to rearrange signal transfers without departing from the invention. Therefore, it is desired to cover all such modifications and variations by the appended claims.

What is claimed is new and desired to be secured by Letters Patent of the United States is:

1. A data processing system including a plurality of addressed locations in a processor unit for processing information stored at addressed locations in response to instructions with address portions, said processor unit comprising:

A. a plurality of addressed storage registers constituting additional addressed locations, each of said instructions having an address portion defining only one of said registers, and one of said registers being a program counter for controlling the processor unit, B. a transfer unit coupled to the address locations, and C. a control unit including:

1. a register selector responsive to one of the instructions for selecting the register addressed by the instruction address portion, and 2. a transfer control unit responsive to said register selector for connecting said transfer unit to said selected register to convey information to or from said selected register.

2. A data processing system as recited in claim 1 wherein each instruction address portion defines an address mode and a register address, said register selector being responsive to the register address for selecting said register and said control unit additionally comprising an address mode controller responsive to the address mode for modifying the utilization of the selected register contents by said processor unit.

3. A data processing system as recited in claim 2 for responding to a first instruction address mode, said address mode controller and said transfer control unit being responsive to the first address mode for connecting said transfer unit to said selected register for conveying the selected register contents as the information.

4. A data processing system as recited in claim 2 for responding to a second instruction address mode wherein:

A. said address mode controller and said transfer control unit are responsive to the second address mode for connecting said transfer unit to a second location defined by the selected register contents for conveying the information to or from the second location, and B. said transfer unit includes means responsive to said address mode controller for incrementing the selected register contents.

5. A data processing system as recited in claim 2 for responding to a third instruction address mode wherein:

A. said transfer unit includes means responsive to said address mode controller and said register selector for immediately decrementing the selected register contents, and B. said address mode controller and said transfer control unit are responsive to the third address mode for connecting said transfer unit to a second location defined by the decremented selected register contents for conveying the information to or from the second location.

6. A data processing system as recited in claim 2 for responding to a fourth instruction address mode and related index value wherein:

A said transfer unit includes an adder unit,

B. said address mode controller, said register selector unit and said transfer control unit are responsive to the fourth address mode for adding the selected register contents and index value to obtain an adder unit output, and c. said address mode controller and said transfer control unit are responsive to the fourth address mode for connecting said transfer unit to a second location defined by the adder unit output for conveying the information to or from the second location.

7. A data processing system as recited in claim 2 wherein the instruction address portion indicates first and second deferral states and wherein said address mode controller and said transfer control unit respond to the first deferral state for connecting said transfer unit to the selected location, said address mode controller and transfer control unit connecting said transfer unit to a second location defined by the selected location contents to convey the information to or from the second location in response to a second deferral state.

8. A data processing system as recited in claim 7 for responding to an instruction with a first address mode and second deferral state, said address mode controller and said transfer control unit being responsive to the instruction for connecting said transfer unit to the second location defined by the selected register contents to convey the information with the second location.

9. A data processing system as recited in claim 7 for responding to an instruction with a second address mode and second deferral state wherein:

A. said address mode controller and said transfer control unit are responsive to the instruction for connecting said transfer unit to the second location defined by the contents of a third location addressed by the selected register contents to convey the information to or from the second location, and B. said transfer unit includes means responsive to said address mode controller for incrementing the selected register contents.

10. A data processing system as recited in claim 7 for responding to an instruction with a third address mode and a second deferral state wherein:

A. said transfer unit includes means responsive to said address mode controller and said register selector for immediately decrementing the selected register contents, and B. said address mode controller and said transfer control unit are responsive to the instruction for connecting said transfer unit to the second location defined by the contents of a third location addressed by the decremented register contents for conveying the information to or from the second location.

11. A data processing system as recited in claim 7 for responding to an instruction with a fourth address mode and a second deferral state and a related index value wherein:

A. said transfer unit includes an adder unit,

B. said address mode controller, said register selector and said transfer control unit are responsive to the fourth address mode for adding the selected register contents and the index value to obtain an adder unit output, and C. said address mode controlled and said transfer control unit are responsive to the fourth address mode and second deferral state for connecting said transfer unit to the second location defined by the contents of a third location addressed by the adder unit output for conveying the information to or from the second location.

12. In a data processing system including a plurality of addressed locations and a processor unit for processing information stored at addressed locations in response to instructions with first and second address portions, said processor unit comprising:

A. a plurality of addressed registers constituting additional addressed locations, each instruction address portion defining only one of said registers and one of said registers being a program counter for controlling the processor unit, B. a transfer unit coupled to the addressed locations for selectively conveying information to or from first and second of the addressed locations, and C. a control unit including:

1. an instruction decoder for generating first and second address signals in response to the first and second instruction address portions respectively, and a timing control signal indicating that the decoded instruction has first and second addresses,
2. a timing unit responsive to the timing control signal for causing said decoder to generate first and second address signals sequentially,
3. a register selector responsive to said timing unit and said instruction decoder for selecting the registers addressed by said instruction address portion as first and second of said addressed registers in sequence, and
4. a transfer control unit responsive to said register selector for connecting said transfer unit to said selected registers in sequence to convey information.

13. A data processing system as recited in claim 12 wherein each instruction address portion includes an address mode portion and a register address, said register selector being responsive to the first and second address signals for selecting said addressed registers in sequence and said control unit additionally comprising an address mode controller responsive to the address mode for modifying the utilization of the selected register contents by said processor unit.

14. A data processing system as recited in claim 13 for responding to a first address mode in one instruction address portion, said address mode controller and said transfer control unit being responsive to the first address mode and said timing unit for connecting said transfer unit to the selected register for conveying the information to or from said selected register.

15. A digital computer as recited in claim 13 for responding to a second address mode in one address portion of an instruction wherein:

A. said address mode controller and said transfer control unit are responsive to the second address mode and said timing unit for connecting said transfer unit to an addressed location defined by the selected register contents for conveying the information contained therein, and B. said transfer unit includes means responsive to said address mode controller for incrementing the selected register contents.

16. A digital computer as recited in claim 15 wherein the one address portion identifies said program counter as said selected register, said control unit connecting said transfer unit to the addressed location following the instruction to convey the information.

17. A data processing system as recited in claim 13 for responding to a third address mode in one address portion of an instruction, wherein:

A. said transfer unit includes means responsive to said address mode controller, said register selector and said timing unit for decrementing the selected register contents and B. said address mode controller and said transfer control unit are responsive to the third address mode and said timing unit for connecting said transfer unit to a second location defined by the decremented selected register contents for conveying information to ro from the second location.

18. A data processing system as recited in claim 13 for responding to a fourth address mode in one address portion of an instruction and a related index value wherein:

A. said transfer unit includes an adder unit,

B. said address mode controller, said register selector and said transfer control unit are responsive to the fourth address mode and said timing unit for adding the selected register contents and index value to obtain an adder unit output, and C. said address mode controller and said transfer control unit are responsive to the fourth address mode and said timing unit for connecting said transfer unit to a second location defined by the adder unit output for conveying the information to or from the second location.

19. A data processing system as recited in claim 18 wherein the one address portion identifies said program counter as said selected register, said control unit connecting said transfer unit to said program counter for adding the program counter contents and index value to obtain the address for the second location.

20. A data processing system as recited in claim 13 wherein each instruction address portion indicates first and second deferral states and wherein said address mode controller and said transfer control unit respond to said timing unit and the first deferral state for connecting said transfer unit to the selected location, said address mode controller and said transfer control unit connecting said transfer unit to a second location defined by the selected location contents to convey the information to or from the second location during the second deferral state.

21. A data processing system as recited in claim 20 wherein each address portion in an instruction comprises diverse address modes and register addresses, said transfer control unit being responsive to said address mode controller, said register selector, said timing unit and said instruction decoder for connecting said transfer unit to a first location defined by one address portion for conveying information to said processor unit and to another location as defined by the other address portion for transferring information from said processor unit to the second location.

22. A data processing system comprising

A a plurality of addressed locations including a memory unit for storing operating instructions in sequence, certain instructions including at least one operand address consisting of address mode and register address portions, and B. a processor unit including:

1. a plurality of registers constituting additional addressed locations, one of said registers being a program counter for identifying instructions for transfer to said processor unit,
2. an instruction decoder responsive to instructions for identifying those instructions with address mode and register selection portions,
3. a register selector responsive to said instruction decoder and an instruction register address portion for selecting any of said registers,
4. A transfer unit including gating means and an arithmetic unit responsive to said instruction decoder for modifying data in accordance with the instruction, said gating means coupling said transfer unit to an addressed location,
5. an address mode controller responsive to said instruction decoder and the address mode portion, and
6. a transfer control unit responsive to said address mode controller and said register selector for enabling said transfer unit to transfer data to or from said selected register.

23. A data processing system as recited in claim 22 wherein said address mode controller and said transfer control unit respond to second contents of the address mode portion for connecting said transfer unit to a second location addressed by the selected register contents for conveying data.

24. A data processing system as recited in claim 23 wherein said address mode controller and said transfer control unit respond to third contents of the address mode portion for connecting said transfer unit to the second location, the second location being addressed by the contents of a third location addressed by the selected register contents to convey data to or from the second location.

UNITED STATES PATENT OFFICE

CERTIFICATE OF CORRECTION

Patent No. 3,614,741 Dated October 19, 1971

Inventor(s) Harold L. McFarland, Jr. et al

It is certified that error appears in the above-identified patent and that said Letters Patent are hereby corrected as shown below:

Column 4, line 56, after "through" insert --in the bus interfacing unit 32,--
Column 9, line 10, after "address" (first occurrence) in Table II, insert --, subsequently incremented,--
Column 10, line 14, replace "FIG. 2" with --FIG. 1--
Column 10, line 19, delete "FIG. 2" and insert --FIGS. 1 and 2--
Column 10, line 21, after "unit 60" insert --(FIG. 2)--
Column 10, line 45, replace "execte" with --execute--
Column 12, line 38, replace "of" with --is--
Column 13, line 19, replace "Pc" with --PC--
Column 13, line 60, replace "word" with --register--
Column 15, line 16, after "register 34" insert --(FIG. 2)--
Column 15, line 56, delete "data path" and insert --arithmetic--
Column 15, line 59, delete "data path" and insert --arithmetic--
Column 15, line 59, delete "A-50" and insert --A-50--
Column 15, line 72, delete "data path" and insert --arithmetic--
Column 15, line 74, delete "GATA-49(Ø)" and insert --GATE A-49(Ø)--
Column 16, line 10, after "typical" insert a period --.--
Column 16, line 27, delete "$S_{n11}$" and insert --$S_{n-1}$--
Column 17, line 21, delete "3.Examples" and insert --V. Examples--
Column 19, line 5, delete "ROregister" and insert --R0 register--
Column 19, line 11, delete "ROregister" and insert --R0 register--
Column 21, line 25, after "how" insert --the--

UNITED STATES PATENT OFFICE
CERTIFICATE OF CORRECTION

Patent No. 3,614,741 Dated October 19, 1971

Inventor(s) Harold L. McFarland, Jr., et al

It is certified that error appears in the above-identified patent and that said Letters Patent are hereby corrected as shown below:

In the Claims

Column 21, line 58, delete "in" and insert --and--
Column 21, line 66, delete "address" and insert --addressed--
Column 23, line 52, delete "portion" and insert --portions--
Column 24, line 25, delete "ro" and insert --or--

In the Drawings

FIG. 12, delete "114" and insert --164--

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*